United States Patent
Rosengaus et al.

(10) Patent No.: US 10,863,105 B1
(45) Date of Patent: Dec. 8, 2020

(54) HIGH DYNAMIC RANGE IMAGING FOR EVENT DETECTION AND INVENTORY MANAGEMENT

(71) Applicant: Amazon Technologies, Inc., Seattle, WA (US)

(72) Inventors: Eliezer Rosengaus, Seattle, WA (US); Abhinav Kashyap, Redmond, WA (US); Lorenzo Sorgi, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 19 days.

(21) Appl. No.: 15/635,031

(22) Filed: Jun. 27, 2017

(51) Int. Cl.
| | |
|---|---|
| H04N 5/235 | (2006.01) |
| H04N 5/225 | (2006.01) |
| G06K 9/62 | (2006.01) |
| G06K 9/46 | (2006.01) |
| G06T 7/33 | (2017.01) |
| H04N 5/445 | (2011.01) |
| G06Q 10/08 | (2012.01) |

(52) U.S. Cl.
CPC ......... *H04N 5/2355* (2013.01); *G06K 9/4661* (2013.01); *G06K 9/6201* (2013.01); *G06Q 10/087* (2013.01); *G06T 7/337* (2017.01); *H04N 5/2258* (2013.01); *H04N 5/44504* (2013.01); *G06T 2207/10024* (2013.01); *G06T 2207/10144* (2013.01); *G06T 2207/30232* (2013.01)

(58) Field of Classification Search
CPC .......... H04N 5/35545; H04N 5/35536; H04N 5/2351; H04N 5/23254; H04N 5/008; H04N 5/0009; H04N 5/2355; G06T 5/50; G06T 2207/20208; G06T 2207/20221; G06T 7/11; G06T 7/337; G06Q 10/087; G06K 9/52; G06K 9/4661; G06K 9/6201
See application file for complete search history.

(56) References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,228,400 B2 * | 7/2012 | Liu | G06T 5/50 |
| | | | 348/208.12 |
| 8,423,431 B1 | 4/2013 | Rouaix et al. | |

(Continued)

OTHER PUBLICATIONS

Fusiello et al. "A Compact Algorithm for Rectification of Stereo Pairs", Feb. 25, 1999, 6 pages.

(Continued)

*Primary Examiner* — Brian P Yenke
(74) *Attorney, Agent, or Firm* — Athorus, PLLC

(57) ABSTRACT

Described are systems and methods for generating high dynamic range ("HDR") images based on image data obtained from different image sensors for use in detecting events and monitoring inventory within a materials handling facility. The different image sensors may be aligned and calibrated and the image data from the sensors may be generated at approximately the same time but at different exposures. The image data may then be preprocessed, matched, aligned, and blended to produce an HDR image that does not include overexposed regions or underexposed regions.

20 Claims, 19 Drawing Sheets

(56) References Cited

U.S. PATENT DOCUMENTS

| | | | |
|---|---|---|---|
| 8,570,396 B2* | 10/2013 | Rapaport | G06F 3/1454 |
| | | | 348/229.1 |
| 8,630,924 B2 | 1/2014 | Groenevelt et al. | |
| 8,688,598 B1 | 4/2014 | Shakes et al. | |
| 8,699,821 B2* | 4/2014 | Orr, IV | G06T 5/50 |
| | | | 382/294 |
| 8,750,636 B2* | 6/2014 | Souchard | G06T 7/20 |
| | | | 348/208.13 |
| 8,896,624 B2* | 11/2014 | Yamamoto | G09G 5/00 |
| | | | 345/207 |
| 8,965,120 B2* | 2/2015 | Yamanaka | G06T 5/003 |
| | | | 382/167 |
| 8,977,073 B2* | 3/2015 | Kwon | G06T 5/50 |
| | | | 382/162 |
| 9,019,402 B2* | 4/2015 | Vranceanu | H04N 5/2355 |
| | | | 348/239 |
| 9,055,231 B2* | 6/2015 | Garten | G09G 5/06 |
| 9,117,134 B1* | 8/2015 | Geiss | G06T 5/009 |
| 9,131,201 B1* | 9/2015 | Geiss | H04N 5/235 |
| 9,349,166 B2* | 5/2016 | Muninder | H04N 5/23216 |
| 9,384,539 B2* | 7/2016 | Park | G06T 5/40 |
| 9,473,747 B2 | 10/2016 | Kobres et al. | |
| 9,483,704 B2* | 11/2016 | Schwartz | G06K 9/00201 |
| 9,600,741 B1* | 3/2017 | Su | G06K 9/52 |
| 9,762,893 B2* | 9/2017 | Barron | G06T 7/269 |
| 9,916,644 B1* | 3/2018 | Swami | G06T 7/194 |
| 10,129,485 B2* | 11/2018 | Benchemsi | G06T 5/009 |
| 10,165,194 B1* | 12/2018 | Baldwin | H04N 5/2355 |
| 10,187,628 B2* | 1/2019 | Barron | G06T 5/007 |
| 10,477,185 B2* | 11/2019 | Barron | G06T 7/30 |
| 10,498,963 B1* | 12/2019 | Sorgi | G06T 7/11 |
| 10,706,587 B1* | 7/2020 | Sorgi | G06T 7/80 |
| 2003/0002712 A1 | 1/2003 | Steenburgh et al. | |
| 2004/0181467 A1 | 9/2004 | Raiyani et al. | |
| 2007/0047833 A1* | 3/2007 | Zhang | G06T 5/50 |
| | | | 382/274 |
| 2008/0043108 A1* | 2/2008 | Jung | H04N 5/232 |
| | | | 348/207.1 |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0121017 A1 | 5/2009 | Cato et al. | |
| 2009/0245573 A1 | 10/2009 | Saptharishi et al. | |
| 2010/0259626 A1* | 10/2010 | Savidge | H04N 5/235 |
| | | | 348/208.4 |
| 2011/0011936 A1 | 1/2011 | Morandi et al. | |
| 2011/0176024 A1* | 7/2011 | Kwon | H04N 5/23232 |
| | | | 348/222.1 |
| 2012/0210229 A1* | 8/2012 | Bryant | H04N 9/73 |
| | | | 715/723 |
| 2012/0284132 A1 | 11/2012 | Kim et al. | |
| 2013/0076898 A1 | 3/2013 | Philippe et al. | |
| 2013/0253700 A1 | 9/2013 | Carson et al. | |
| 2013/0329004 A1* | 12/2013 | Baqai | H04N 5/217 |
| | | | 348/36 |
| 2014/0176730 A1* | 6/2014 | Kaji | H04N 9/3185 |
| | | | 348/189 |
| 2014/0176731 A1* | 6/2014 | Geiss | H04N 5/2355 |
| | | | 348/207.1 |
| 2014/0198226 A1* | 7/2014 | Lee | H04N 5/2355 |
| | | | 348/208.1 |
| 2014/0279294 A1 | 9/2014 | Field-Darragh et al. | |
| 2014/0307960 A1* | 10/2014 | Sharma | H04N 5/23229 |
| | | | 382/162 |
| 2014/0347521 A1* | 11/2014 | Hasinoff | H04N 5/2355 |
| | | | 348/239 |
| 2014/0362223 A1 | 12/2014 | LaCroix et al. | |
| 2015/0019391 A1 | 1/2015 | Kumar et al. | |
| 2015/0043811 A1* | 2/2015 | Prabhudesai | G06T 5/008 |
| | | | 382/164 |
| 2015/0073907 A1 | 3/2015 | Purves et al. | |
| 2015/0116525 A1* | 4/2015 | Peng | G06T 5/50 |
| | | | 348/218.1 |
| 2015/0170389 A1* | 6/2015 | Ming | G06K 9/00684 |
| | | | 382/284 |
| 2015/0348242 A1* | 12/2015 | Molgaard | G06T 5/50 |
| | | | 348/241 |
| 2015/0350509 A1* | 12/2015 | Tico | H04N 5/23277 |
| | | | 348/362 |
| 2015/0350547 A1* | 12/2015 | Nariani-Schulze | |
| | | | H04N 5/23254 |
| | | | 348/208.1 |
| 2016/0267695 A1* | 9/2016 | Opdenbosch | G06K 9/52 |
| 2016/0371634 A1* | 12/2016 | Kumar | G06Q 10/087 |
| 2017/0018062 A1* | 1/2017 | Li | H04N 5/35554 |
| 2017/0069060 A1* | 3/2017 | Baqai | G06T 5/002 |
| 2017/0163966 A1* | 6/2017 | Barron | G06T 7/38 |
| 2017/0318243 A1* | 11/2017 | Ise | H04N 5/243 |
| 2017/0359534 A1* | 12/2017 | Li | H04N 5/2258 |
| 2018/0035058 A1* | 2/2018 | Thumpudi | H04N 5/265 |
| 2018/0060803 A1* | 3/2018 | Cheruku | G06K 9/00771 |
| 2018/0060804 A1* | 3/2018 | Cheruku | G06K 9/00771 |
| 2018/0082408 A1* | 3/2018 | Dewhurst | H04N 5/2355 |
| 2018/0160051 A1* | 6/2018 | Schaefer | H04N 5/265 |
| 2018/0241929 A1* | 8/2018 | Bouzaraa | H04N 5/2355 |
| 2018/0374233 A1* | 12/2018 | Zhou | G06T 7/70 |
| 2019/0147598 A1* | 5/2019 | Sawai | G06T 7/194 |
| | | | 382/283 |

OTHER PUBLICATIONS

Https://en.wikipedia.org/wiki/Exposure_fusion.

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

US 10,863,105 B1

HIGH DYNAMIC RANGE IMAGING FOR EVENT DETECTION AND INVENTORY MANAGEMENT

BACKGROUND

Today, imaging devices such as digital cameras are frequently used for conducting surveillance or monitoring operations. For example, digital cameras are often used to monitor the arrivals or departures of goods or the performance of services in materials handling facilities such as warehouses, fulfillment centers, retail establishments or other like facilities, as well as the travels of persons or objects in locations such as airports, stadiums or other dense environments, or the flow of traffic on one or more sidewalks, roadways or highways. Digital cameras are commonplace in financial settings such as banks or casinos, where money changes hands in large amounts or at high rates of speed.

When conducting surveillance or monitoring operations, digital cameras may be aligned and configured to capture imaging data such as still or moving images of actions or events occurring within their respective fields of view. Information regarding the captured imaging data or the observed actions or events may be subjected to further analysis to identify aspects, elements or features of the content expressed therein. In performing such operations, digital cameras may be utilized alone or in groups and objects may be tracked as they move between fields of views of different cameras.

In environments with varying lighting conditions, such as materials handling facilities, transportation centers, financial institutions or like structures in which different light sources are present in different areas, it may be difficult to determine events in regions of images that become overexposed by excessive light from the different light sources.

DETAILED DESCRIPTION

Figure 1:
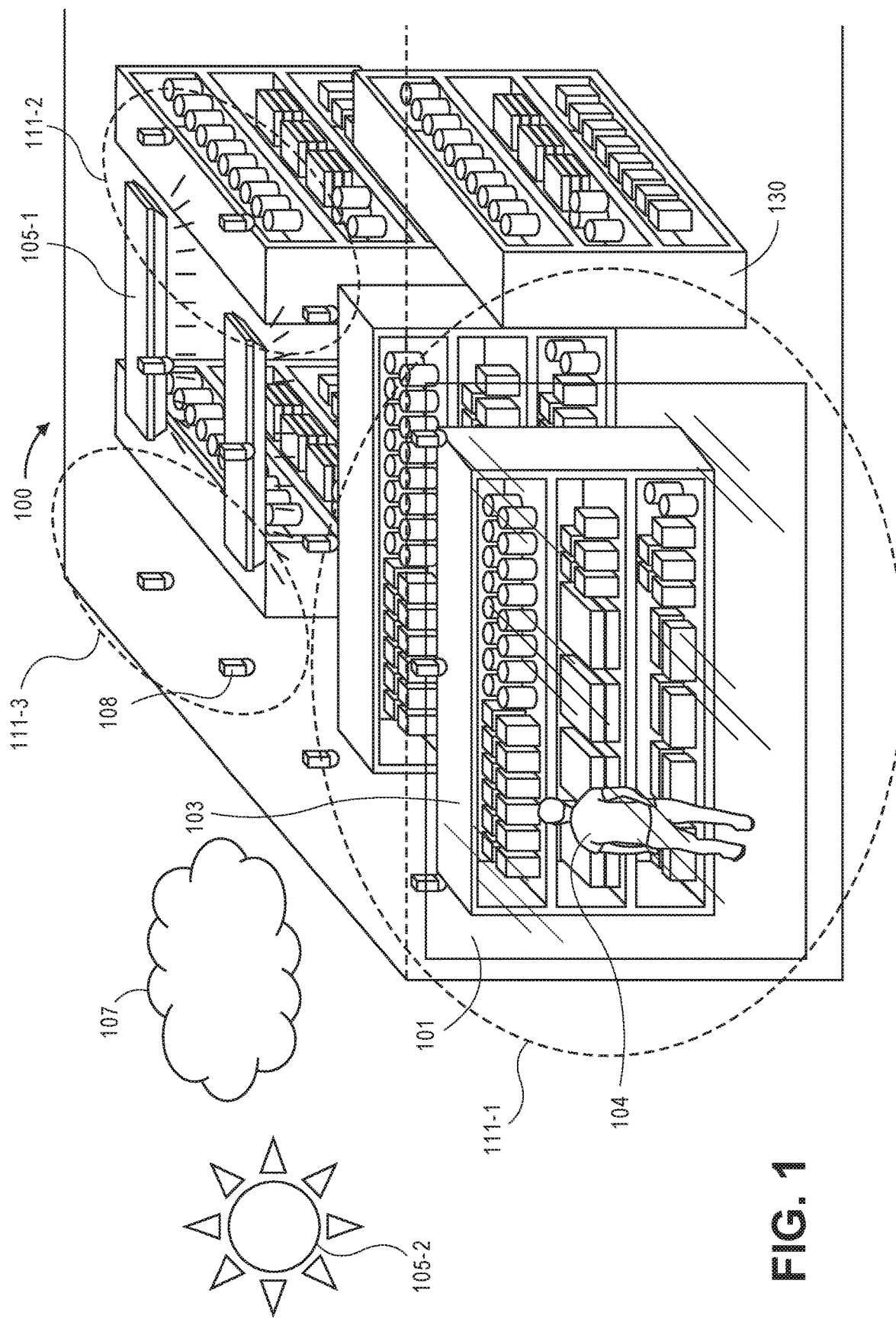
FIG. 1 is a diagram illustrating a materials handling facility with varying lighting conditions, in accordance with described implementations.

This disclosure describes a multiple-image sensor system, process, and apparatus for generating images having a high dynamic range ("HDR") based on image data obtained from the different image sensors. Traditional HDR cameras use the same image sensors and obtain images at different exposures sequentially in time, rather than simultaneously. In comparison, the disclosed implementations include two or more image sensors that generate image data at approximately the same time. In some examples, the two or more image sensors may be horizontally aligned and calibrated so that their fields of view overlap and are approximately aligned. The first image sensor may generate first image data at a first time and at a first exposure. The first exposure may be in a first exposure range (e.g., 0 to 100 lux). Likewise, the second image sensor may generate second image data at the first time and at a second exposure that is different than the first exposure. The second exposure may be in a second exposure range (e.g., 100 to 200 lux). Because of the different exposures, one or more regions of the first image may be underexposed and one or more regions of the second image may be overexposed.

The first image data and the second image data are then matched and aligned. Moreover, regions in the second image data that include pixels that are overexposed are determined. Pixel values from the second image that corresponds to the pixels overexposed regions of the first image may be used to replace the pixel values of the overexposed pixels of the first image data.

Utilizing two image sensors that generate image data at approximately the same time and combining different regions of image data from those two images resolves problems inherent in traditional HDR solutions. Specifically, as noted above, traditional HDR solutions utilize the same image sensor and generate different images at different exposures at sequential points in time that are then combined to form an HDR image. While such techniques work well for images of stationary objects, it inherently introduces motion blur for any moving objects captured in the image due to the difference in time that the two images are generated. Such motion blur makes object tracking or event detection difficult if not impossible.

In the described implementations, because the images are generated at approximately the same time, there is no motion blur introduced into the combined image. Likewise, by preprocessing, matching, aligning, and blending the two images as discussed herein, different regions of the images may be combined, even though there is some disparity between the fields of view of the image sensors due to the offset of the image sensors. In other implementations, the image data need not be generated at approximately the same time and may still be combined, as discussed herein, to produce an HDR image.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, banks, casinos, airports, or other facilities or combinations of facilities for performing one or more functions of materials (inventory) handling.

"Exposure" is used herein as it is understood in the art. Specifically, exposure refers to the amount of light per unit area (the image plane illuminance times the exposure time) reaching the image sensor, as determined by shutter speed, lens aperture, and sensor sensitivity (ISO) of an imaging device. Exposure is measured in lux seconds. An image, pixels of an image, or a region of an image is considered overexposed when the pixels of the region experience a loss of detail or data such that portions of the imaged object are not represented by the data and the brighter areas represented by the pixels cannot be distinguished from white. Similarly, an image, region, or pixels of an image are considered underexposed when there is a loss of shadow detail, that is, when dark areas are indistinguishable from black.

FIG. 1 is a block diagram of a portion of a materials handling facility 100 with varying lighting conditions, in accordance with described implementations. In the illustrated example, the materials handling facility 100 may include a plurality of inventory locations 130 and one or more artificial illumination sources, such as ceiling lighting 105-1, floor lighting, etc., that produce light within the materials handling facility 100. In addition to the illumination sources 105-1 within the materials handling facility, other illumination sources, such as natural illumination sources, including the sun 105-2 or moon, and/or other artificial illumination sources external to the materials handling facility may impart light within one or more areas of the materials handling facility. For example, the materials handling facility may include one or more transparent or semi-transparent perimeters, such as a window 101, doors, skylights, etc., through which light produced from natural (e.g., sunlight) and/or artificial illumination source(s) external to the materials handling facility passes to illuminate areas 111 within the materials handling facility.

Light falls on every portion or point within an environment, such as the interior of a materials handling facility, and is then reflected from that environment point. The illumination sources 105 that generate the light reaching different areas within an environment may be characterized by their geometric properties and by their photometric properties. Examples of geometric properties are their shape (e.g., a point source, a light strip (linear source), an area source (sun, moon)) and the directions at which the illumination source 105 spreads the light. The photometric properties of an illumination source 105 refer to the intensity of light that the illumination source 105 emits. In addition, illumination sources 105 generally produce light at different wavelengths. Therefore, we refer to the intensity of light as a function of wavelength, or spectrum. In addition to direct light within an environment, there is also ambient light, which refers to light from all sources that is reflected from other points within the environment (e.g., walls, floors, and ceilings).

Once light falls on an environment point, some of the light is reflected while other parts of the light are absorbed, or reflected in a different direction. In general, we specify the way an object or other material interacts with light by specifying how much light is reflected in every direction, for every incoming direction of the light. The reflectiveness of an object may be referred to as Bidirectional Reflectance Distribution Function ("BRDF"), which may also depend on the wavelength of the light. For purposes of this discussion, we will consider all surfaces of objects as evenly reflecting light in all directions and independent of the direction of the incoming light. In addition, we will refer to the albedo or intrinsic reflectance of an object as the measure of percentage of light that is reflected by the surface of the object. As an example, a black surface has zero reflectance because it absorbs all incoming light.

The materials handling facility also includes a network of imaging devices 108. In the illustrated example, each imaging device includes two or more image sensors that are horizontally aligned and each pair of image sensors is configured to generate images at approximately the same time, but at different exposures. As discussed further below with respect to FIG. 2, any number of sensors may be included in each imaging device 108. Likewise, the imaging devices may be mounted overhead, as illustrated in FIG. 1, mounted on or inventor shelving units, as discussed further below with respect to FIG. 14, or otherwise located in the materials handling facility.

While the implementations discussed herein describe the image sensors of the imaging devices in the form of digital color cameras or digital color video cameras, it will be appreciated that the image sensors may be any form of image sensor including, but not limited to, digital image sensors, depth sensors, range sensors, infrared sensors, monochrome sensors, or radiographic sensors. Likewise, while the color space discussed herein is the YUV color space, the described implementations are equally applicable to other color spaces, including, but not limited to RGB, Y'UV, YUV, YCbCr, YPbPr, etc.

Reflected light may be captured or detected by an image sensor if the reflected light is within the image sensor's field of view, which is defined as a function of a distance between the sensor and a lens utilized with the sensor, viz., a focal length, as well as a location of the image sensor and corresponding lens and an angular orientation of the lens. Accordingly, where an object appears within a depth of field, or a distance within the field of view where the clarity and focus is sufficiently sharp, an image sensor may capture light that is reflected off objects of any kind to a sufficiently high degree of resolution and produce image data representative of the reflected light.

When light is received it is integrated by the image sensor (e.g., a photosensitive surface with a plurality of pixel sensors provided thereon). Image sensors may detect information regarding aspects of any number of pixels of the reflected light corresponding to one or more base colors (e.g., red, green or blue) of the reflected light, or distances to objects from which the light was reflected. Pixel readout is a result of integrating all absorbed photons of light at all wavelengths. In the discussed examples, the image data for each pixel is represented in the YUV color space. The Y channel, also referred to as the luma or luminance channel, and the U channel and V channel are the two color or chroma channels.

Returning to FIG. 1, as will be appreciated, different areas 111 within a materials handling facility 100 may experience different lighting conditions. For example, a first area 111-1 of the materials handling facility may have a first set of lighting conditions due to natural light passing through a window, direct light from artificial illumination sources within the materials handling facility 100, and ambient light. In comparison, other areas, such as areas 111-2 and 111-3 that are farther within the interior of the materials handling facility may have different lighting conditions because those areas do not receive direct natural light and/or because the light from the artificial illumination sources is different. Still further, the geometry of the areas may impact the lighting conditions. For example, areas with large objects (e.g., inventory shelves) may affect how light falls on surfaces within the area and thus, how much light is eventually received by the imaging devices in that area.

Because the position, orientation, etc., of imaging devices may vary over time and because the illumination of the environment being imaged by the imaging device may likewise vary with respect to time, generated images with a high dynamic range that will provide image detail in essentially any range of lighting conditions is important. For example, as the time of day, position of the sun 105-2, and/or weather conditions change, such as clouds 107 passing between the sun 105-2 and the materials handling facility 100, the lighting conditions within different areas of the materials handling facility may change. As a result, some portions of the materials handling facility may receive direct sunlight during a portion of the day and be darker during other portions of the day.

The described high dynamic range images that do not introduce motion blur provide the ability to detect agent activity and monitor inventory within the materials handling facility. For example, if an agent 104 is working with inventory at the first inventory area 103 in the morning, there may be no direct sunlight passing through the window 101. However, if the agent is working with inventory at the first inventory area 103 in the afternoon, direct sunlight from the sun 105-2 may pass through the window 101 and onto a portion of the inventory area. Without the ability to produce a high dynamic range image, as discussed herein, activities by the agent may not be detectable during each of those different lighting conditions.

Figure 2:
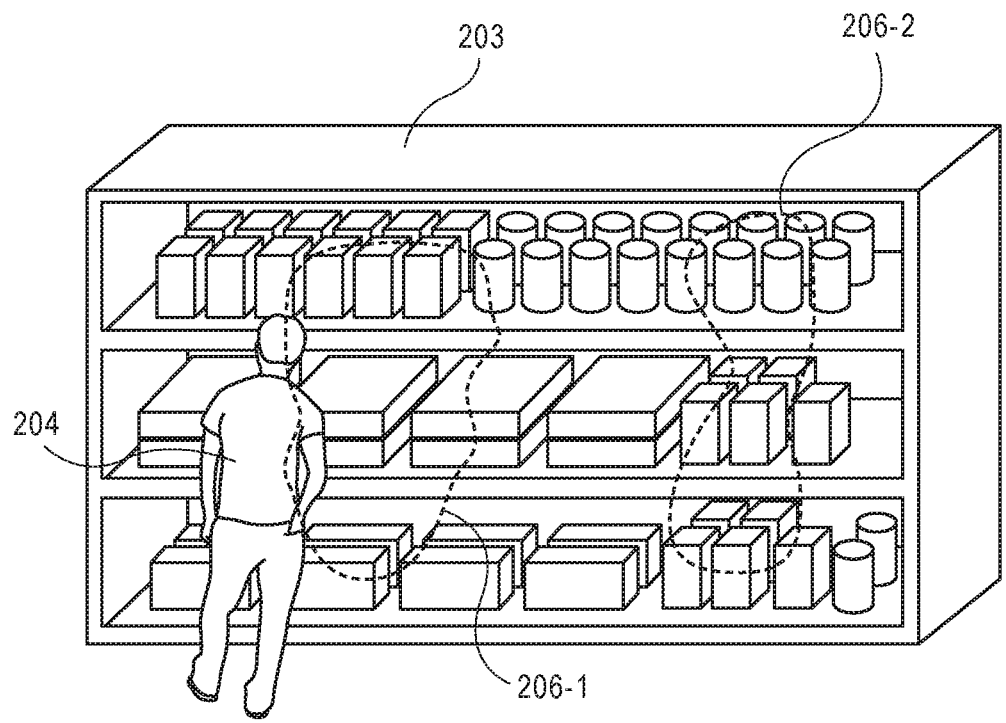
FIG. 2 is a diagram of an inventory location and a multi-sensor imaging device, in accordance with described implementations.
Figure 2:
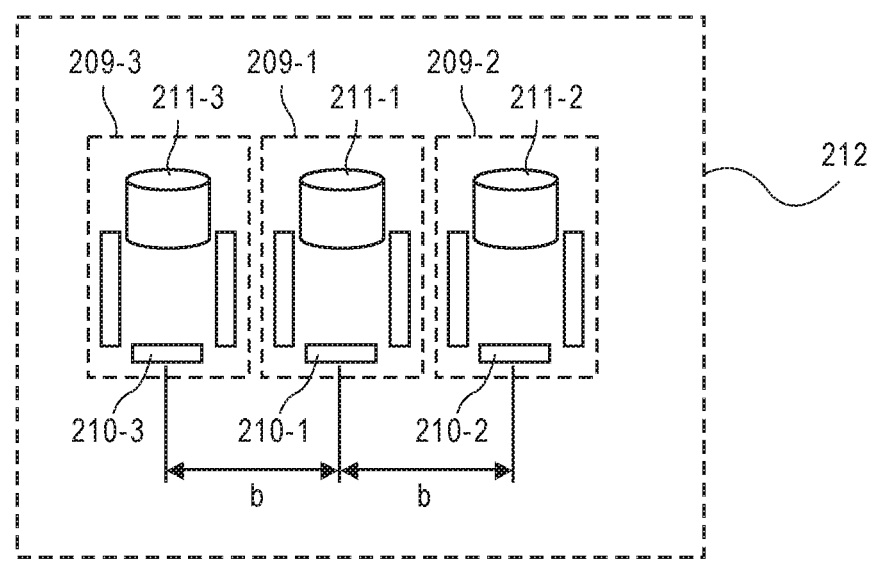

FIG. 2 is a diagram of an inventory area 203 and a multi-sensor imaging device 212, in accordance with described implementations. In this example, the multi-sensor imaging device 212 includes three image sensors 210-1, 210-2, and 210-3 and corresponding lenses 211-1, 211-2, and 211-3 horizontally aligned and equally spaced. In some implementations, each image sensor and lens may be an independent digital camera 209-1, 209-2, and 209-3. In other implementations, the image sensors 210-1, 210-2, and 210-3 may be affixed to the same substrate and/or the lenses 211 may be mechanically coupled together to collectively form one imaging sensor 212 that includes three individual sensors 210-1, 210-2, and 210-3 and corresponding lenses 211-1, 211-2, and 211-3.

Calibration of the imaging device 212 and each of the image sensors may be periodically performed, performed at manufacture, and/or performed at installation. For example, markers included in the field of view of each lens 211 and sensor 210 pair may be used to calibrate an alignment of the pixels of each sensor 210 so that each row of pixels of each sensor are horizontally aligned, or rectified. This may be done by detecting the markers in representations of the image data and aligning the rows of pixels based on the pixels in each image data determined to represent the markers. Likewise, a baseline distance ("b") between each sensor 210 may be known, the distance to one or more markers within the field of view of each lens 211 and sensor 210 pair may be known, and those distances may further be utilized to calibrate the imaging device 212.

In the illustrated example, sunlight is shining directly onto two regions 206-1 and 206-2 of the inventory area such that the lighting conditions within the inventory area and experienced by the imaging device 212 vary across the inventory area. While such lighting conditions may not hinder the agent's 204 ability to work in the area, it may adversely affect image generation because it may cause image data generated at some exposures to be overexposed such that activities occurring in those regions cannot be determined from the image data. To resolve this problem, as discussed further below, the three image sensors may generate images at approximately the same time but at different exposures. For example, the first image sensor 210-1 may generate first image data corresponding to a first image at a first time and with a first exposure. The second image sensor 210-2 may generate second image data corresponding to a second image at the first time and with a second exposure that is different than the first exposure. The third image sensor 210-3 may generate third image data corresponding to a third image at the first time and with a third exposure that is different than the first exposure and the second exposure. As discussed above, exposure may be altered by adjusting any one or more of the lens aperture, shutter speed or ISO of the sensor.

By generating images at approximately the same time, each with a different exposure, the image data of those images collectively represent all data of the inventory area and may be combined, as discussed further below, to produce a high dynamic range image that does not introduce motion blur resulting from objects moving in the image.

Figure 3:
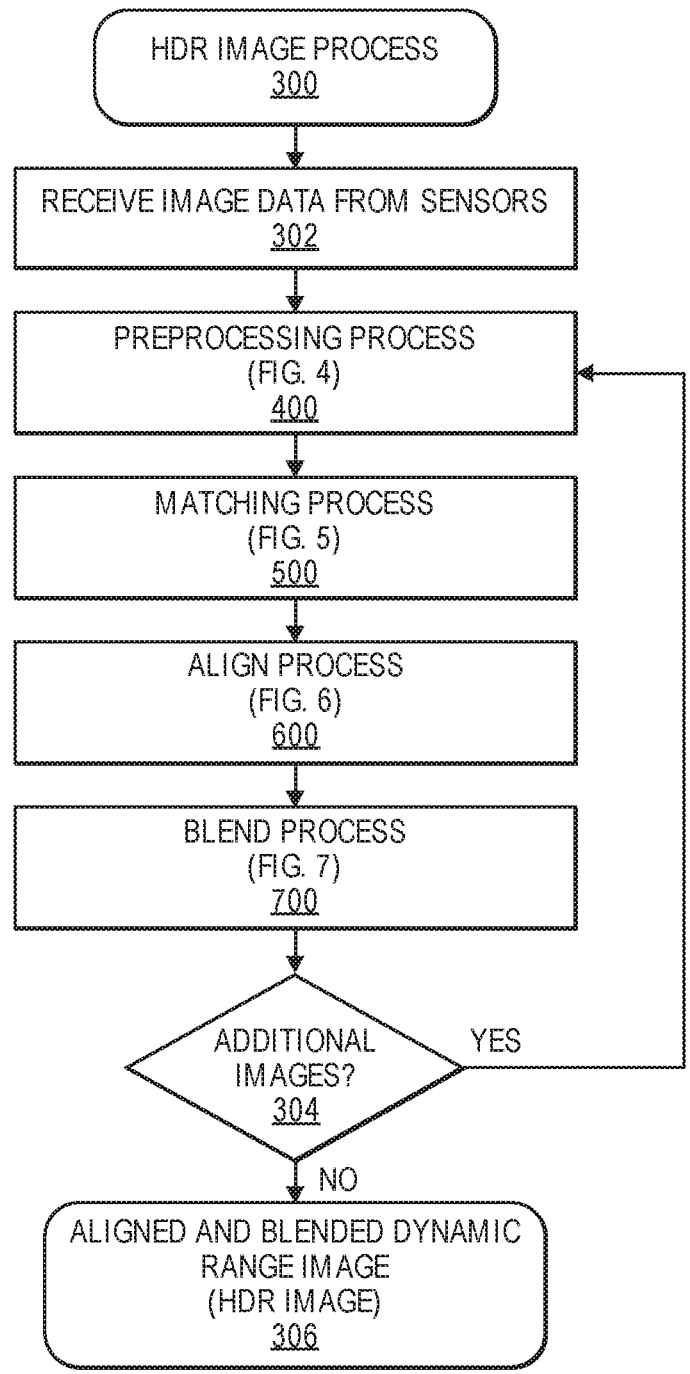
FIG. 3 is a flow diagram of an example high dynamic range image creation process, in accordance with described implementations.

FIG. 3 is a flow diagram of an example high dynamic range image creation process 300, in accordance with described implementations. While the example process 300 illustrates the preprocessing 400, matching 500, alignment 600 and blending 700 processes as being performed for sets of images in series, it will be appreciated that image data from multiple image sensors may be processed by each of the discussed processes 400-700 in parallel to form an HDR image.

The example process 300 begins upon receipt of image data from different image sensors of an imaging device, as in 302. For example, image data generated by the three image sensors 210-1, 201-2, and 210-3 may be received by a computing resource executing the example process 300. As noted above, the image data corresponds to overlapping fields of view, is generated at approximately the same time, and generated at different exposures. In one example, the first image data may have an exposure between 0 lux and 20,000 lux, the second image data may have an exposure between 20,000 lux and 40,000 lux and the third image data may have an exposure between 40,000 lux and 60,000 lux. In other implementations, the exposure of the different image data may be different and/or be within different ranges.

Upon receiving the image data, the image data is preprocessed, as in 400. As discussed further below with respect to FIG. 4, preprocessing of the image data includes, for each item of image data, decomposing the image data into the luminance channel and each of the two-color channels and then warping the luminance channel using a rectification homography so that rows of pixels of the different image data are horizontally aligned and can be matched. Warping and rectification of the image data is necessary because each item of image data is obtained from a different origin because the sensors and corresponding lenses are not co-aligned, but are offset with respect to one another.

After preprocessing of the image data, pixels from two of the images are matched using a matching process, as in 500. The matching process is discussed in further detail with respect to FIGS. 5A and 5B. Matching between two images is performed using the luminance (Y) channel of pixels of the two images to produce a set of alignment disparities for pixels of different regions of the two images that may be used to align those two images. The regions of the images that are matched may correspond to regions that are overexposed in the received image data and/or regions that are overexposed based on an alteration of the received image data to produce regions that are overexposed.

After the matching process has completed and alignment disparities for pixels of each region determined, the pixels of the two images are aligned using an alignment process, as in 600. The alignment process is discussed in further detail below with respect to FIG. 6. The alignment process utilizes the luminance channel and both color channels of both items of image data and is further based on the rectification homographies and utilizes pixels within regions of one image that are not overexposed to replace corresponding pixels of the other image that are overexposed to produce an aligned image that utilizes data from each of the first image data and the second image data. For example, the first image may include a region of pixels that are overexposed and the second image may include pixels that corresponds to that region that are not overexposed. Through the alignment process, pixel values of pixels from the first image that are outside the region may be used in conjunction with pixel values of pixels from the second image that are within the region to produce an aligned, or composite image.

Figure 7:
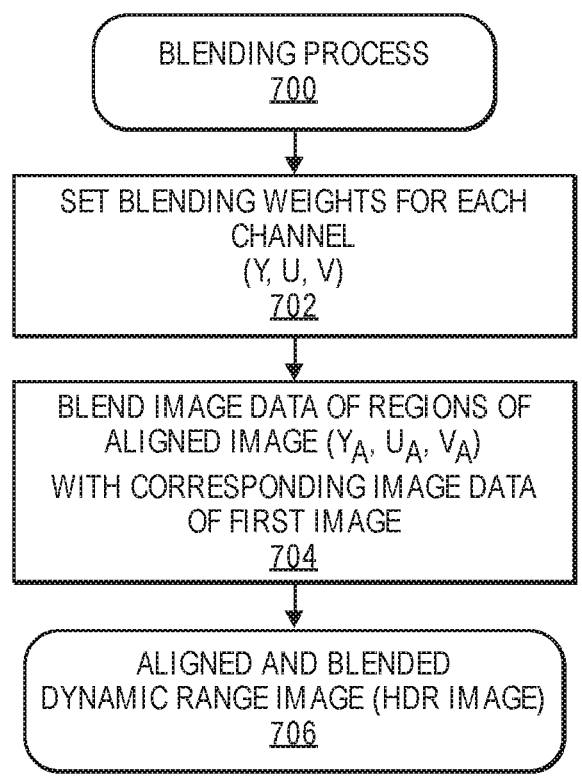
FIG. 7 is a flow diagram of an example high dynamic range blending process, in accordance with described implementations.

Upon completion of the alignment process, the image data of the aligned image may be blended according to a blending process, as in 700. The blending process is discussed in further detail below with respect to FIG. 7. Blending may be performed on the aligned image to reduce differences between pixels (e.g., color) occurring along the boundary of the region at which pixels from the first image are utilized on one side of the region boundary and pixels from the second image are utilized on the other side of the region boundary.

After blending the aligned image, a determination is made as to whether any additional images from the imaging device that were obtained at approximately the same time as the first two images were received by the example process 300, as in 304. For example, the imaging device 210 (FIG. 2) may provide three images, each of which are generated at approximately the same time but at different exposures. If it is determined that there are additional images, the example process 300 returns to block 400 and continues, utilizing the aligned and blended image and the additional image to complete the process again. For example, the aligned and blended image may become the first image, discussed above, and the additional image may become the second image, discussed above. If it is determined that there are no additional images to process, the example process 300 completes with an HDR image, as in 306.

Figure 4:
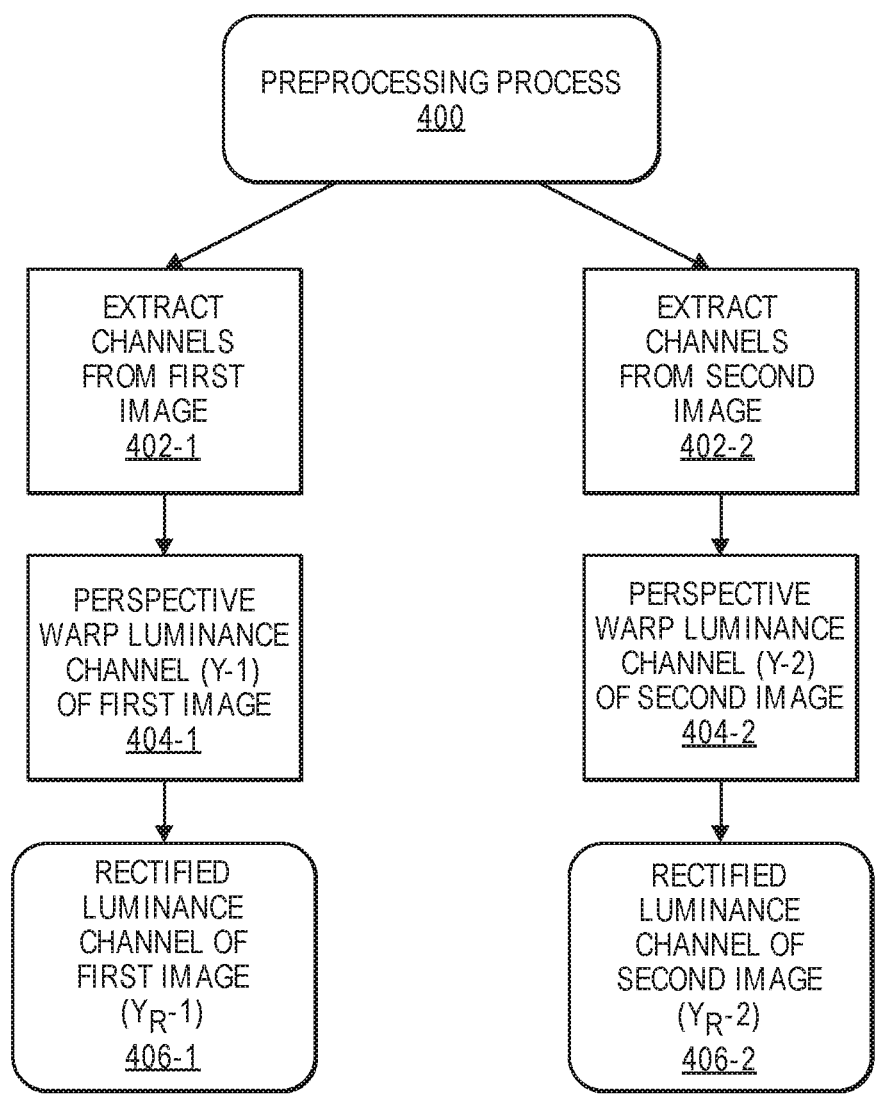
FIG. 4 is a flow diagram of an example high dynamic range preprocessing process, in accordance with described implementations.

FIG. 4 is a flow diagram of an example high dynamic range preprocessing process 400, in accordance with described implementations. The preprocessing is performed on two images that include image data that was generated at approximately the same time. The two images may be two images received from different image sensors of an imaging device. Alternatively, the two images may be an aligned image produced by the example process 300 and another image from the imaging device that provided the first two images that were used to produce the aligned image. As discussed above, if more than two images are being processed, the preprocessing may be performed in parallel for any number of images.

For explanation purposes with respect to FIGS. 4-7, we will refer to first image data and the first image as image data received from the first image sensor 210-1 of the imaging device 212 and second image data and second image as image data received from the second image sensor 210-2 of the imaging device 212 (FIG. 2).

Returning to FIG. 4, preprocessing includes, for each of the first image and the second image, extracting channels from the image data, as in 402-1 and 402-2. In one example, the channels are extracted as a luminance channel (Y), and two color channels (U, V). In other implementations, the image data may be extracted into other color spaces. Utilizing the YUV color space is beneficial because the luminance channel is represented independent of the color channels and may be used for image rectification and matching of the two images without the color channels. Using the luminance channel alone reduces computation time and needed processing capabilities.

Upon channel extraction, the first luminance channel (Y-1) of the first image data is perspective warped according to a known rectification homography for the first image sensor 210-1 from which the image data was received, as in 404-1. Likewise, the second luminance channel (Y-2) of the second image data is perspective warped according to a known rectification homography of the second image sensor from which the image data was received, as in 404-2. The rectification homographies for the two image sensors may be the same or different and may be produced by calibrating the two image sensors based on the orientation of the lenses, the baseline distance between the two image sensors, and/or the parameter values (e.g., gain, aperture, etc.) of each of the pairs of lenses and image sensors. The rectification homographies correlate rows of pixels of the first image data with rows of pixels of the second image data such that respective rows of pixels from the image data are horizontally aligned.

Figure 5A:
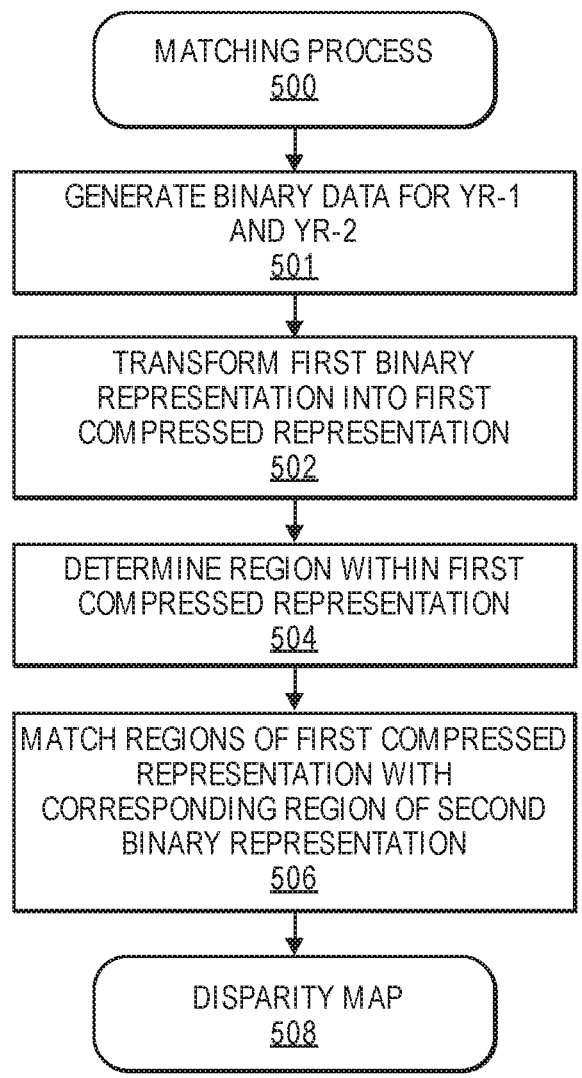
FIG. 5A is a flow diagram of an example high dynamic range matching process, in accordance with described implementations.
Figure 8A:
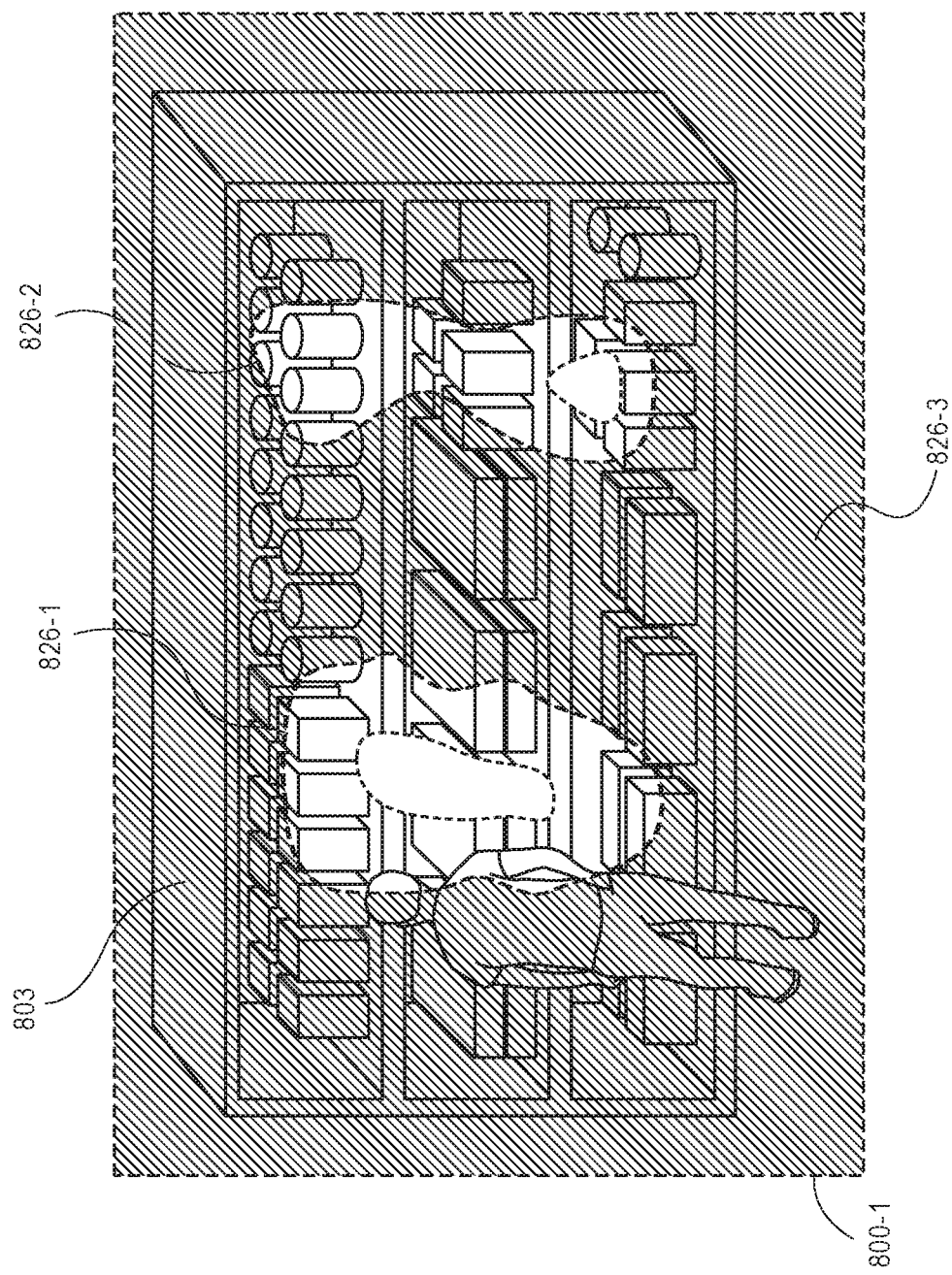
FIG. 8A is an illustration of first image data obtained by a first image sensor of the multi-sensor imaging device at a first exposure, in accordance with described implementations.
Figure 8B:
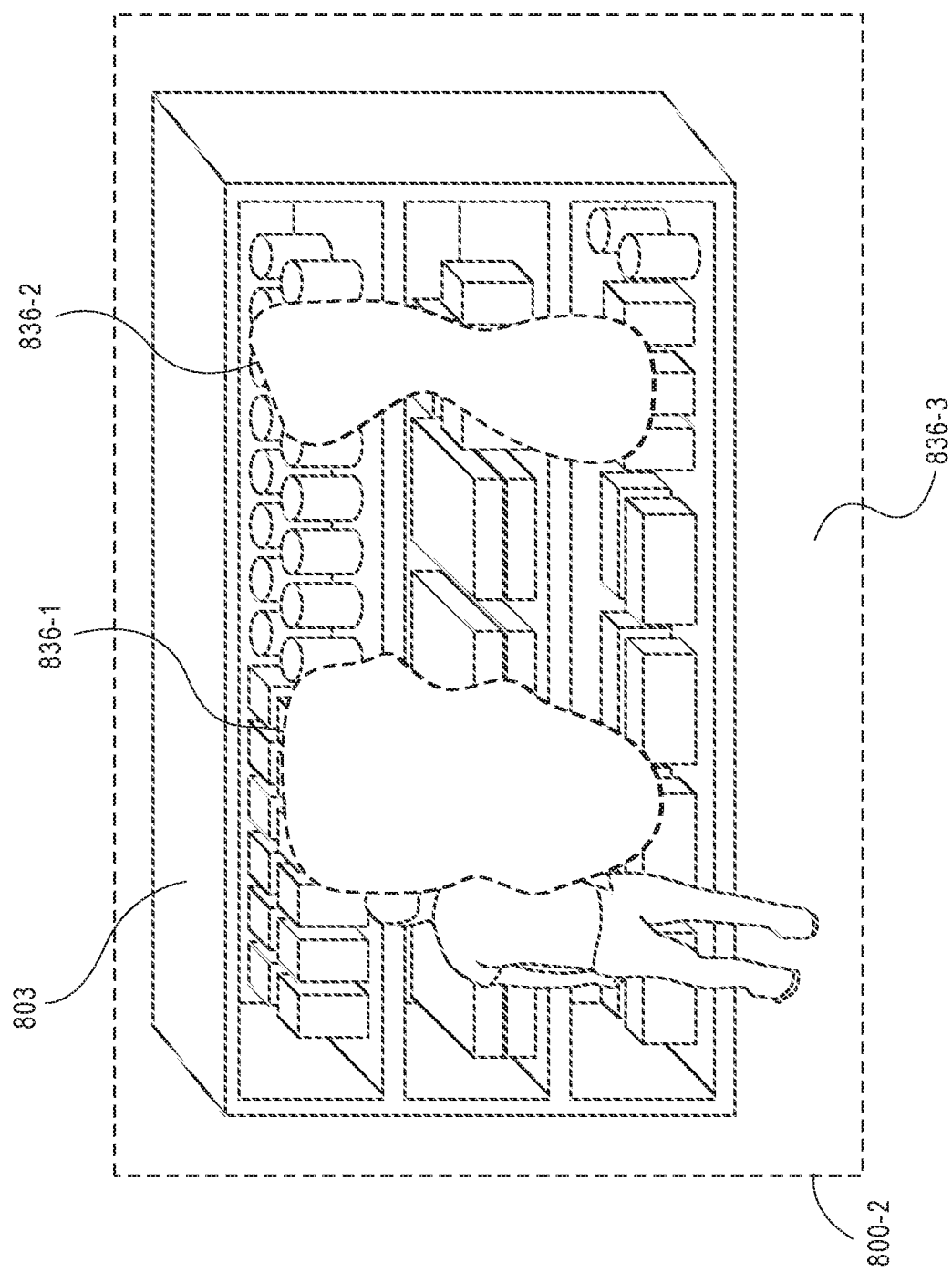
FIG. 8B is an illustration of second image data obtained by a second image sensor of the multi-sensor imaging device at a second exposure, in accordance with described implementations.

Upon rectification, the preprocessing process 400 produces a rectified luminance channel (YR-1) for the first image data and a rectified luminance channel (YR-2) for the second image data, as in 406-1 and 406-2, respectively. The rectified luminance channels (YR-1, YR-2) are provided to and used by the matching process 500 (FIG. 5A). FIG. 8A is an example illustration 800-1 produced from the luminance channel YR-1 of the rectified luminance channel and FIG. 8B is an example illustration 800-2 produced from the luminance channel YR-2 of the rectified luminance channel 800-2. As illustrated and as discussed further below, due to the exposure of the second image, pixels within the regions 836-1 and 836-2 of the second image, as represented by the illustration 800-2, are overexposed and do not include data that can be used to represent the imaged object, the inventory area 803 in this example. Pixels of other portions 836-3 of the image data are not overexposed. In this example, the overexposed regions correspond to the sunlight shining on those regions of the inventory area 803.

In comparison, as shown by the illustration 800-1 of FIG. 8A, the luminance channel from the image data produced from the first image sensor at a different exposure has regions 826-1 and 826-2 that include pixels that are partially overexposed but maintain some data representative of the imaged object, the inventory area 803. Likewise, the pixels of the remaining portion 826-3 are slightly underexposed due to the shortened exposure by the image sensor.

FIG. 5A is a flow diagram of an example high dynamic range matching process 500, in accordance with described implementations. The matching process 500 begins upon completion of the preprocessing process (FIG. 4) and creation of the rectified illumination channels for the two images. The example process first generates first binary data for pixels of the first rectified luminance channel and second binary data for pixels of the second rectified luminance channel, as in 501. The binary data may be generated using exposure-dependent thresholding. For example, any pixel having a luminance value above a defined threshold value may be assigned a value of 1 and any pixel having a luminance value below the threshold value may be assigned a value of 0. Likewise, in some implementations, if there are no values above the threshold range, the luminance channel of the pixels of the image data may be altered to increase the luminance values until thresholding can be performed. Alternatively, different thresholding values on the two different luminance channels may be used because the exposure of the two images is different. Regardless of whether the luminance is altered or the threshold values are different for the different luminance channels, the thresholding is performed to produce two binary image representations that are similar.

Optionally, one of the two binary representations are transformed into a compressed binary representation, as in 502. For example, the binary representation of the first luminance channel may be compressed using run length encoding to compress runs of identical numbers to produce an RL-encoded binary representation. Compressing one of the binary representations reduces the data and speeds processing time.

Figure 5B:
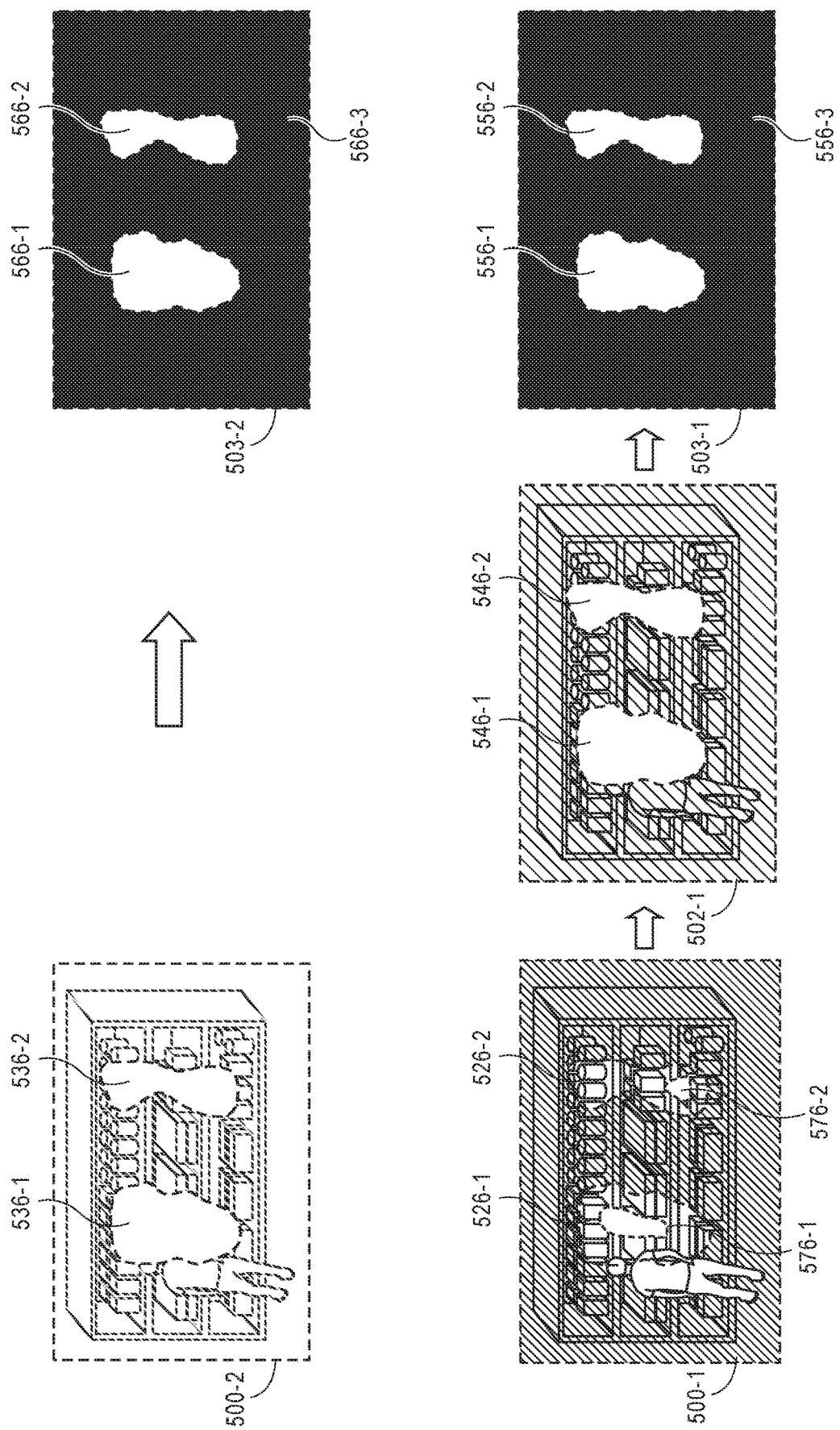
FIG. 5B is an illustration of image data as part of the matching process, in accordance with described implementations.

Referring to FIG. 5B, illustrated is a series of representations corresponding to the matching process 500, in accordance with described implementations. Representation 500-1 illustrates the first rectified luminance channel (YR-1) resulting from image data provided by the first image sensors 210-1 (FIG. 2) of the imaging device 212 of the inventory area 203 and representation 500-2 illustrates the second rectified luminance channel (YR-2) resulting from the image data provided by the second image sensor 210-2 (FIG. 2) of the imaging device 212 of the inventory area 203 that was generated at approximately the same time.

As illustrated in representation 500-2, which was produced from image data that has a different exposure than the image data used to produce representation 500-1, there are two regions 536-1 and 536-2 in the representation that are overexposed from the sunlight that is shining on the inventory area such that there is no data available in the luminance channel of the pixels within those regions 536-1, 536-2. In this example, the threshold value may be set at the lowest value of the luminance channel of pixels in those regions and a binary representation 503-2 produced that is a mask that distinguishes between the regions 566-1 and 566-2, corresponding to the overexposed portion of the representation, and the portion 566-3 of the representation 500-2 that is outside the region and has corresponding luminance values below the threshold.

In comparison, the representation 500-1, produced from the first rectified luminance channel (YR-1) has smaller regions 576-1 and 576-2 that are overexposed due to the different exposure, but also includes data in regions 526-1 and 526-2 that is not overexposed. Therefore, portions of the representation 500-1 corresponding to the regions 536-1 and 536-2 include data corresponding to the object that was imaged. To produce similar binary representations, in this example, the threshold value utilized with the representation 500-1 is adjusted or the rectified luminance channel values are increased until the regions 546-1 and 546-2 appear overexposed, as illustrated in representation 502-1. Once the threshold values are set for the two representations, the representations are binarized to produce a first binary representation 503-1 that includes two regions 556-1 and 556-2 and a remaining portion 556-3 and a second binary representation 503-2 that includes two regions 566-1 and 566-2 that are of a similar size and position as regions 556-1 and 556-2, and also include a remaining portion 566-3. The binarized representations function as masks indicating the regions of pixels that are overexposed in one or more of the image data.

Returning now to FIG. 5A, a region of one of the images, such as the image that was RL-encoded, is determined, as in 504, and a matching region from the second binary representation is determined, as in 506. By generating the masks through transformation of the rectified luminance channel data, the representations produced from the two binary representations can be quickly matched and used to align the image data of the entire image. For example, the pixels corresponding to the boundary of each region, which are identifiable by a shift between binary values, may be aligned and a disparity, or offset, determined between pixels of the corresponding images. Additionally, because the image data is rectified such that rows of pixels between the image data is horizontally aligned, the disparity may be quickly determined by processing corresponding horizontal rows of pixels to determine changes in the binary values. Likewise, the disparity for other segments of the image may be assumed to be similar. Based on the disparity determined for the corresponding regions, a disparity map between the two images is established that indicates the horizontal offset between pixels along each row of pixels of the first image data compared to the same row of pixels of the second image data, as in 508. Such matching and disparity determination requires limited processing because of the binary aspect of the single luminance channels and because the image data is rectified.

Figure 6:
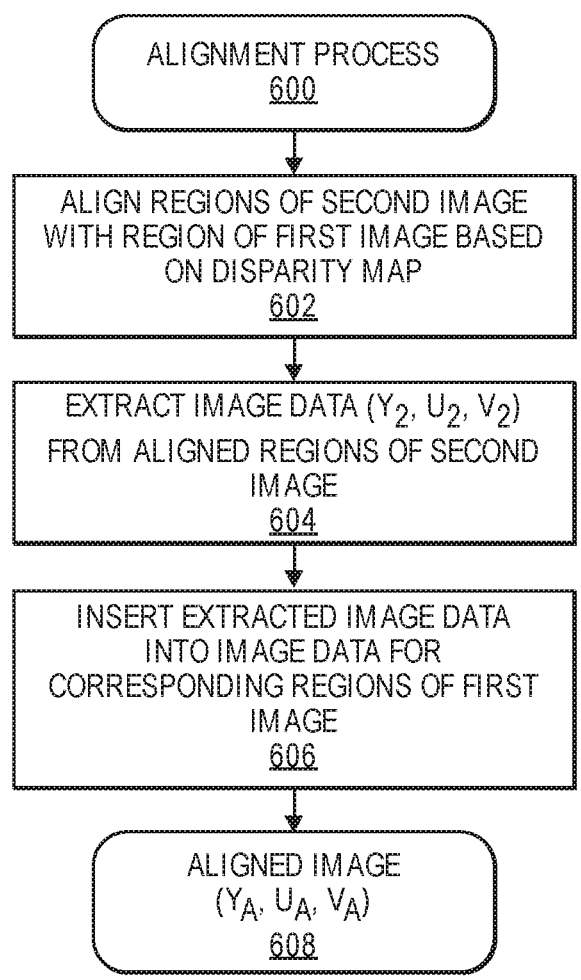
FIG. 6 is a flow diagram of an example high dynamic range alignment process, in accordance with described implementations.

FIG. 6 is a flow diagram of an example high dynamic range alignment process 600, in accordance with described implementations. While the example processes 400 (FIG. 4) and 500 (FIG. 5A) are performed using only the luminance channel, or information determined from the luminance channel, the example process 600 is performed with respect to all channels of the first image data and the second image data, but leverages the disparity map computed by the example process 500 (FIG. 5A).

The example process 600 begins upon completion of the matching process 500 (FIG. 5A) by aligning regions of the first image with regions of the second image based on the disparity map, as in 602.

Figure 9:
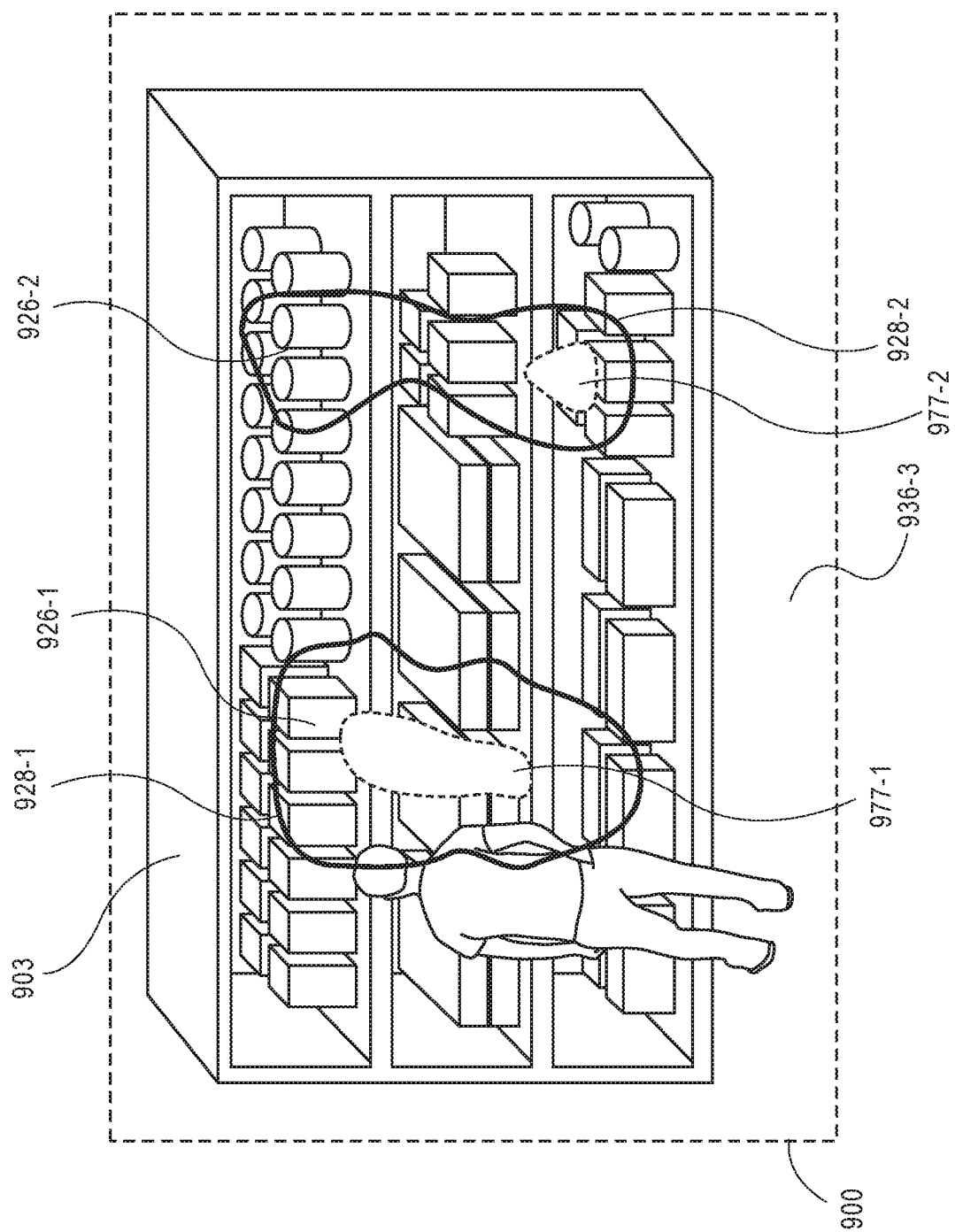
FIG. 9 is an illustration of a matching and alignment between the first image data and the second image data of FIGS. 8A and 8B, in accordance with described implementations.

Upon alignment of the regions, pixel values for pixels from one of the images that are within a determined region that are not overexposed is extracted from the image data, as in 604, and used as the pixel values in the other image data for that region, as in 606. For example, and continuing with the above example of using the image data produced from the first image sensor and the second image sensor, referring to FIG. 9, the representation 900 includes pixel values of a portion 936-3 from the second image data that are not overexposed and pixel values of pixels from the first image within the regions 926-1 and 926-2 to form the aligned representation 900. The disparity map is used to align the images based on the pixels along the boundaries 928-1 and 928-2 of the regions determined in each of the first image data and the second image data. By aligning pixels along the boundaries of the regions between the two images, the other portions of the image are likewise aligned. However, as illustrated, there is a distinct difference between the image data from the second image that is used for the portion 936-3 and the image data from the first image that is used for the regions 926-1 and 926-2. In addition, in this example, even after combining the image data there are still two smaller regions 976-1 and 976-2 that are overexposed.

By combining image data from different images obtained at the same time with different exposures, the overexposed regions of one image can be filled or reduced with image data, pixel values, from a second image that is not overexposed, thereby providing an increased amount usable data that is representative of the imaged object, in this example the inventory area 903.

In some implementations, the pixel values extracted from the first image and inserted into the image data of the second image replaces the corresponding pixel values of the second image. In other implementations, rather than inserting the extracted pixel values into the second image, a separate aligned image, also referred to herein as a composite image or combined image, is created that includes the extracted pixel values from the first image and the pixel values from the second image for pixels that are not within the region(s).

Once the image data has been aligned, the example process completes with the aligned image data ($Y_A$, $U_A$, $V_A$), as in 608. The image data of the aligned image produced from the alignment process 600 (FIG. 6) is then blended according to a blending process 700 (FIG. 7), in accordance with described implementations.

A variety of blending techniques may be utilized to blend the image data to form a final HDR image and the process 700 is provided as an example. The example process 700 begins by setting blending weights for each channel ($Y_A$, $U_A$, $V_A$) of the aligned image, as in 702. Blending weights specify the amount of image data from the first image to blend with image data of the second image, the amount of image data from the first image to blend with the aligned image, or the amount of image data from the second image to blend with the aligned image. For example, an equal amount of image data from both images may be utilized to produce pixel values that are an average of the corresponding pixel values of the first image data and the second image data. In some implementations, blending may only be performed along the border of the regions of image data. For example, pixels values of pixels along the border of a region included in the aligned image may be blended based on pixel values of adjacent pixels within the aligned image to reduce the visual difference in the image that occurs from aligning rectified image data from different images taken at different exposures. In other implementations, blending of the two sets of image data may be performed across the entire image. In such an example, different blending weights may be used for different portions of the image. For example, a first blending weight may be used for pixels within the first region and a second blending weight may be used for pixels outside the first region.

Based on blending weights, the channel data for pixels of regions of the aligned image are blended with corresponding channel data of pixels of the first image, as in 704. Blending is done to smooth out the visual difference between the image data within a region and image data outside a region that is included in the aligned image. After blending, an aligned and blended dynamic range image results, an HDR image, that is a combination of image data from both the first image and the second image, as in 706.

While the example process 700 describes blending using blending weights, in other implementations, other forms or blending techniques may be utilized to blend the combined data. For example, the image data may be blended using Gaussian and/or Laplacian pyramid blending techniques.

Figure 10:
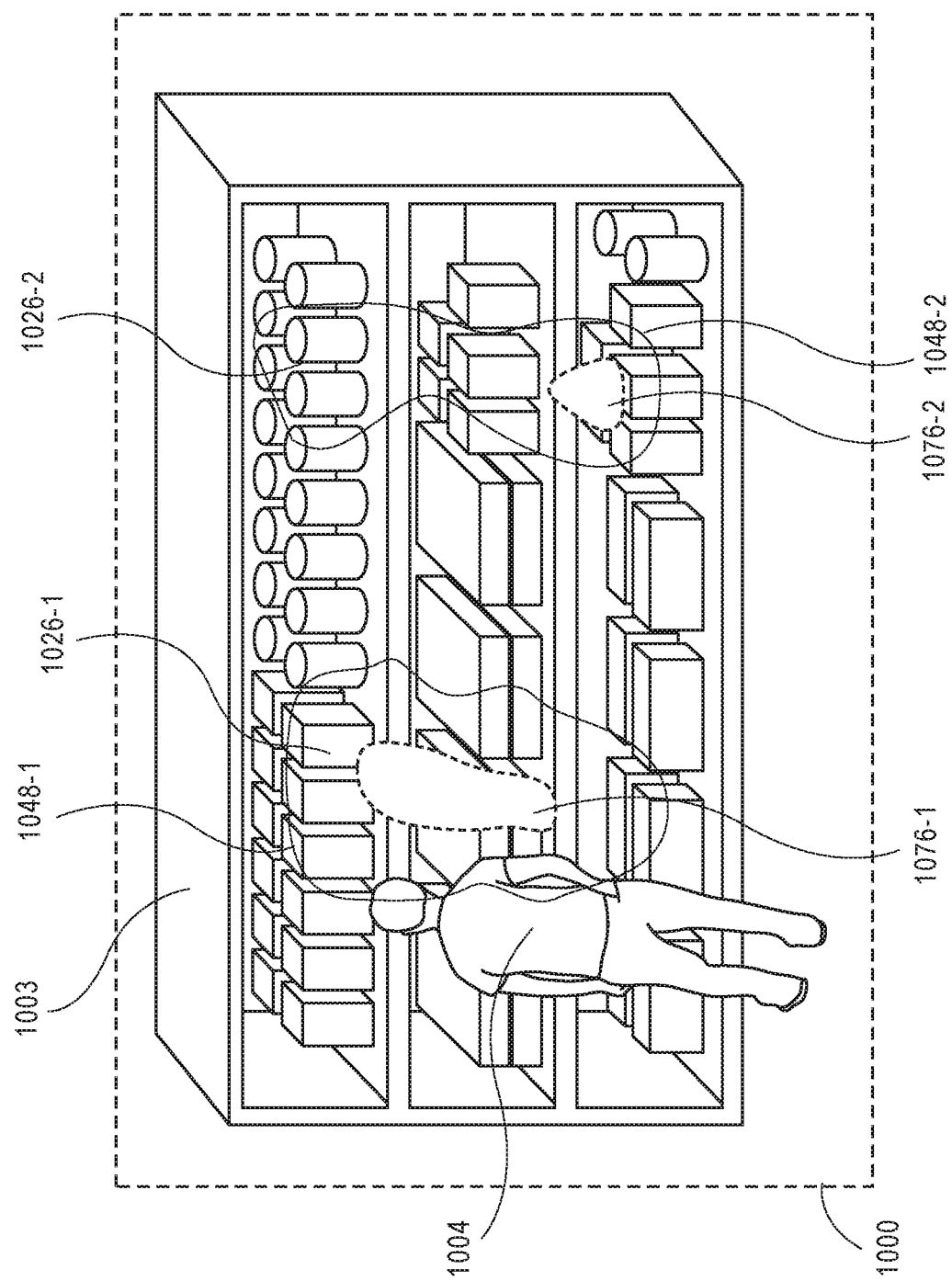
FIG. 10 is an illustration of a blending between the matched and aligned first image data and second image data illustrated in FIG. 9 to produce an aligned image, in accordance with the described implementations.

FIG. 10 illustrates an HDR image 1000 produced from the aligned image 900 (FIG. 9) after completion of the blending process. As illustrated, by blending the image data either based on adjacent pixels along the boundary 1048-1 and 1048-2 of the regions 1026-1 and 1026-2, and/or using one or more other blending techniques, the visual difference between the two sources of image data is reduced and provides an HDR image with usable data representative of the imaged object, the inventory area 1003. In addition, because the image data was produced by different image sensors at approximately the same time and rectified as part of the creation of the HDR image 1000, any movement of the agent 1004 does not result in motion blur that occurs with traditional HDR images that generate the images used to create the HDR image at different points in time (sequentially). However, in this example, because both sets of image data include pixels that are overexposed, the HDR image 1000 includes regions 1076-1 and 1076-2 of pixels that are overexposed and do not include data for the represented area.

As discussed with respect to FIG. 3, after creation of the HDR image at the completion of the blending process 700 (FIG. 7), it may be determined whether there is additional image data from the imaging device that was generated by another image sensor at approximately the same time as the image data that was used to produce the HDR image. For example, FIG. 2 illustrates that the imaging device 212 includes three image sensors that each produce image data at approximately the same time but at different exposures. If additional image data exists, the example processes 400, 500, 600, and 700 discussed above with respect to FIGS. 4, 5A, 6, and 7 may be repeated using the HDR image as the first image and the additional image as the second image.

Figure 8C:
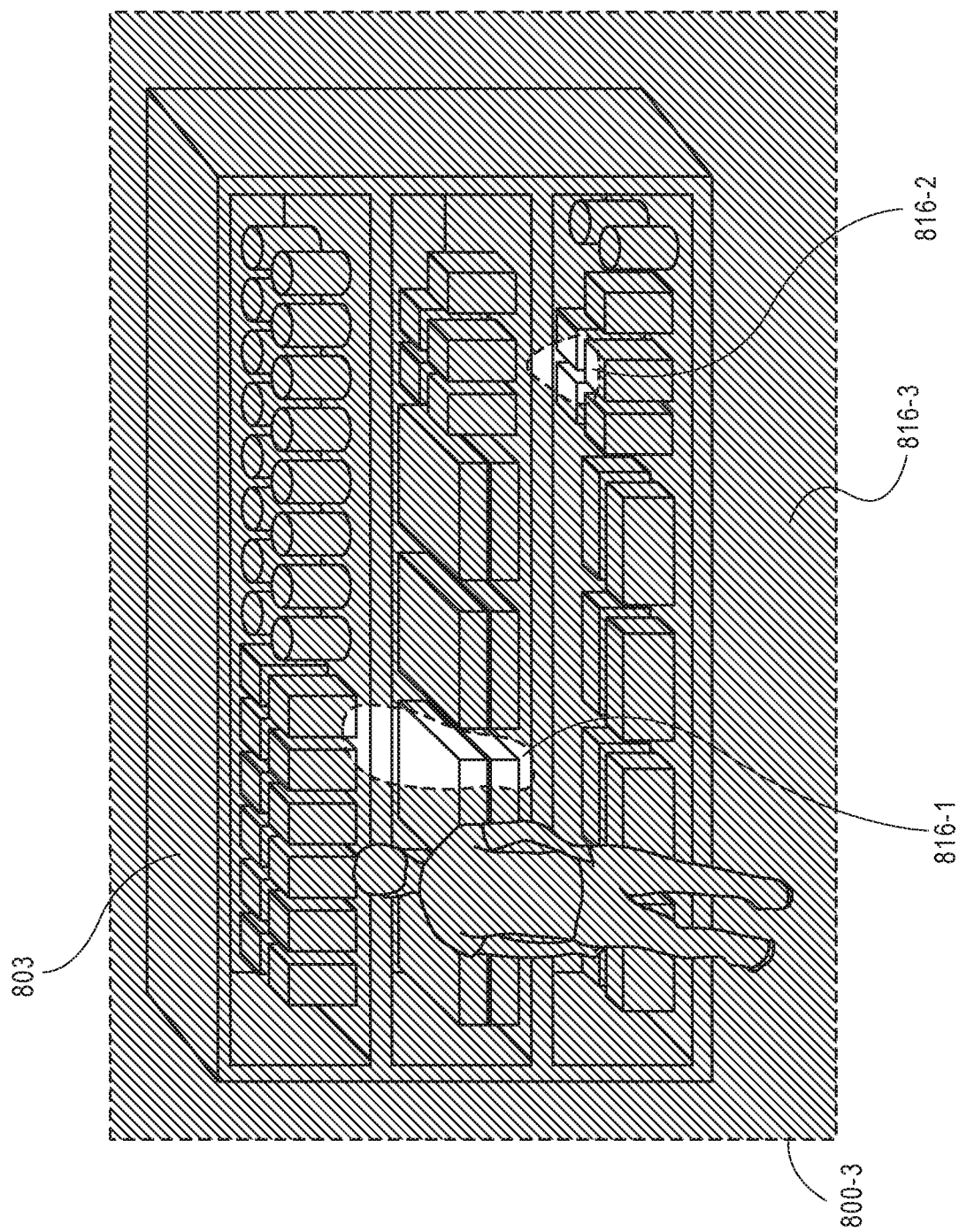
FIG. 8C is an illustration of third image data obtained by a third sensor of the multi-sensor imaging device at a third exposure, in accordance with described implementations.

For example, FIG. 8C illustrates a representation 800-3 of image data from the third image sensor 210-3 generated at approximately the same time as the first image data 800-1 (FIG. 8A) and second image data 800-2 (FIG. 8B), but at a different exposure. In this example, image data 800-3 is produced at a third exposure that results in the portion 816-3 of the image data 800-3 being underexposed. However, the image data within regions 816-1 and 816-2 is not overexposed.

Figure 11:
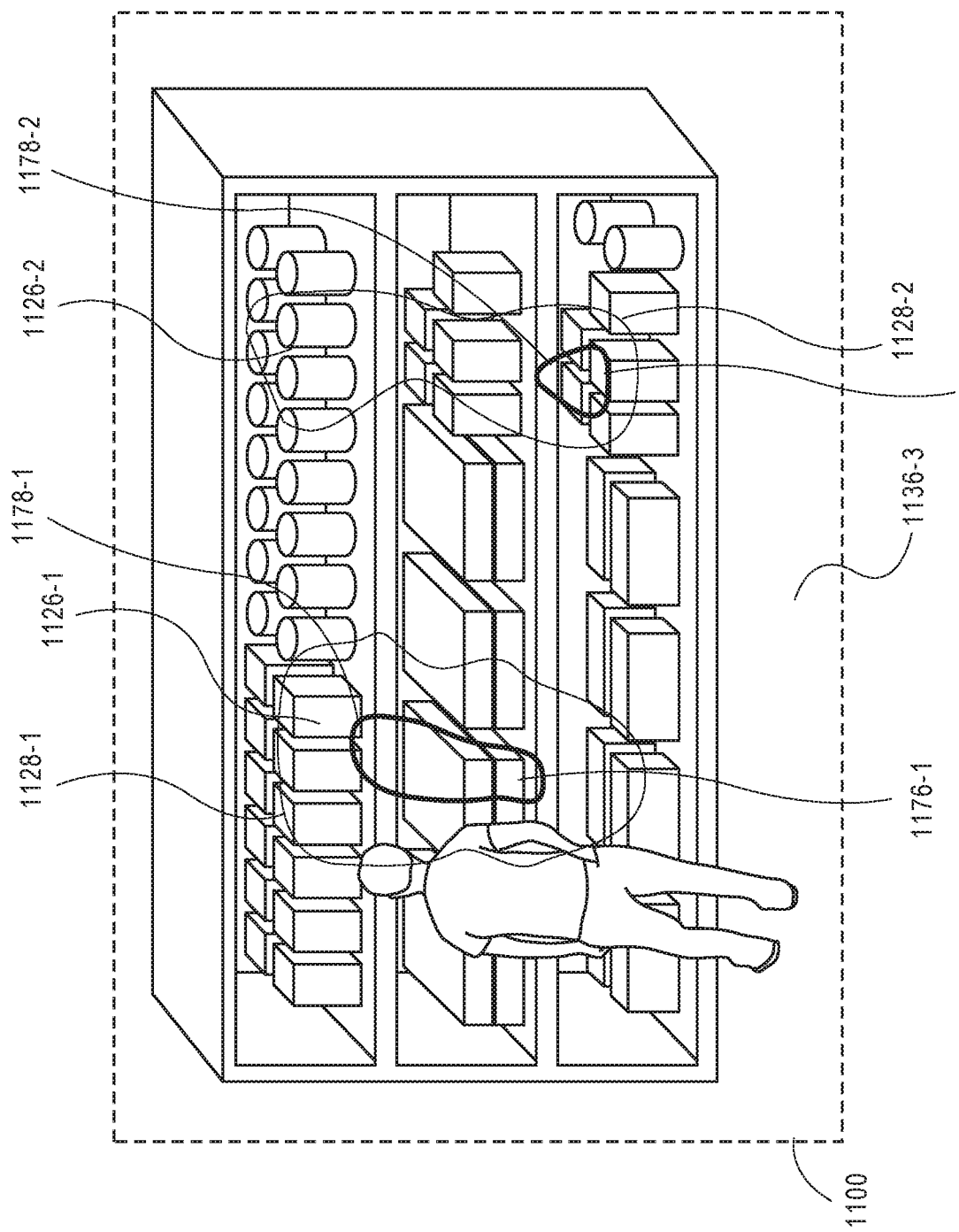
FIG. 11 is an illustration of a matching and alignment between the third image data represented in FIG. 8C and the aligned image illustrated in FIG. 10, in accordance with described implementations.
Figure 12:
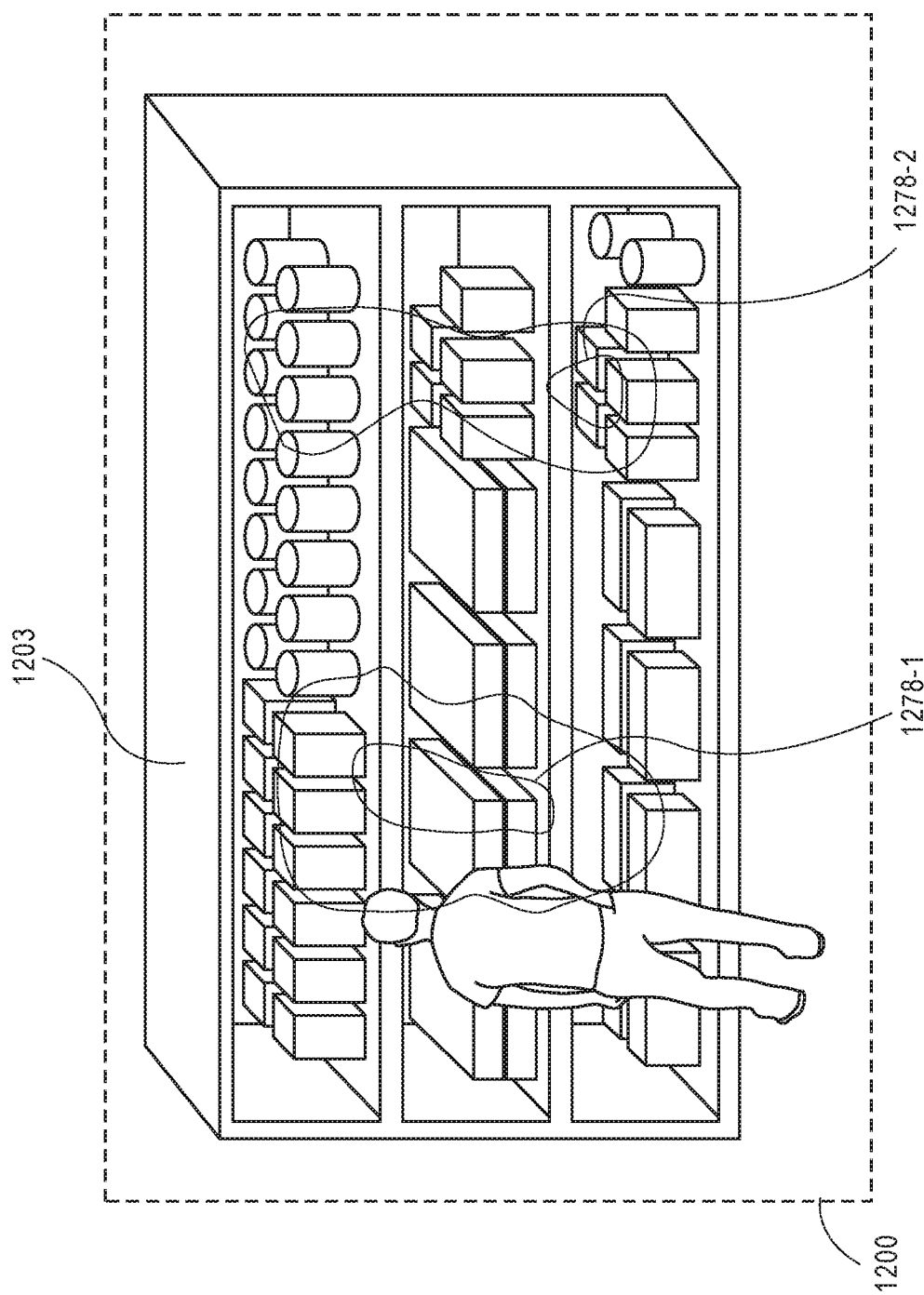
FIG. 12 is an illustration of a blending between the matched and aligned third image data and aligned image illustrated in FIG. 11 to produce a high dynamic range image, in accordance with described implementations.

Utilizing the third image data corresponding to the third image, as illustrated in FIG. 8C in conjunction with the HDR image produced from the first image data 800-1 and the second image data 800-2, as discussed above, upon completion of the preprocessing process 400, matching process 500, and alignment process 600, the aligned image data is illustrated in FIG. 11. The regions 1136-3, 1126-1, and 1126-2 of the image 1100 utilize pixel values from the HDR image produced from the first image data 800-1 and the second image data 800-2. Regions 1176-1 and 1176-2 utilize pixel values from pixels within the regions 816-1 and 816-2 (FIG. 8) of the third image data 800-3. The blending process 700 may then be used to blend the image data and reduce or eliminate the boundary 1178-1 and 1178-2 between the regions 1176-1 and 1176-2 and the regions 1126-1 and 1126-2 of the image 1110 to produce an HDR image 1200 (FIG. 12). Once blended, the borders 1178-1 and 1178-2 will be reduced in a manner similar to the borders 1128-2 and 1128-2 to form a complete HDR image 1100 that includes data representative of the imaged objects.

As illustrated in FIG. 12, by completing the processes 400, 500, 600, and 700 multiple times and/or simultaneously to consider each image received from image sensors of an imaging device, the final HDR image will include image data across a dynamic range such that agent activity and inventory management may be monitored in varying lighting conditions for the entire inventory area 1203. Likewise, boundaries or borders between the different portions of image data used from different images, such as boundaries 1278-1 and 1278-2 are reduced or eliminated.

As discussed above, while the example processes are described as performed in series for different images, in other implementations, all three images, or more, may be processed together in parallel to form the HDR image.

While the examples discuss combining image data to produce HDR images that do not include overexposed regions that lack data, the same processes 400, 500, 600, and 700 may likewise be used to produce HDR images that do not include underexposed regions. For example, an underexposed region may be determined in first image data, a corresponding region determined in second image data, the two regions matched, the two images aligned, and then blended to produce an HDR image that does not include underexposed data. Accordingly, the implementations described herein may be used to generate HDR images that avoid motion blur from moving objects and eliminate lost data from both underexposed regions and overexposed regions.

In addition, while the above examples discuss processing image data of a materials handling facility and/or an inventory location, the described implementations are equally applicable to any other location, whether indoors or outdoors and should not be considered limited to an inventory location and/or a materials handling facility. For example, the implementations may be used with imaging devices of self-driving vehicles, unmanned aerial vehicles, surveillance systems, and the like.

Figure 13:
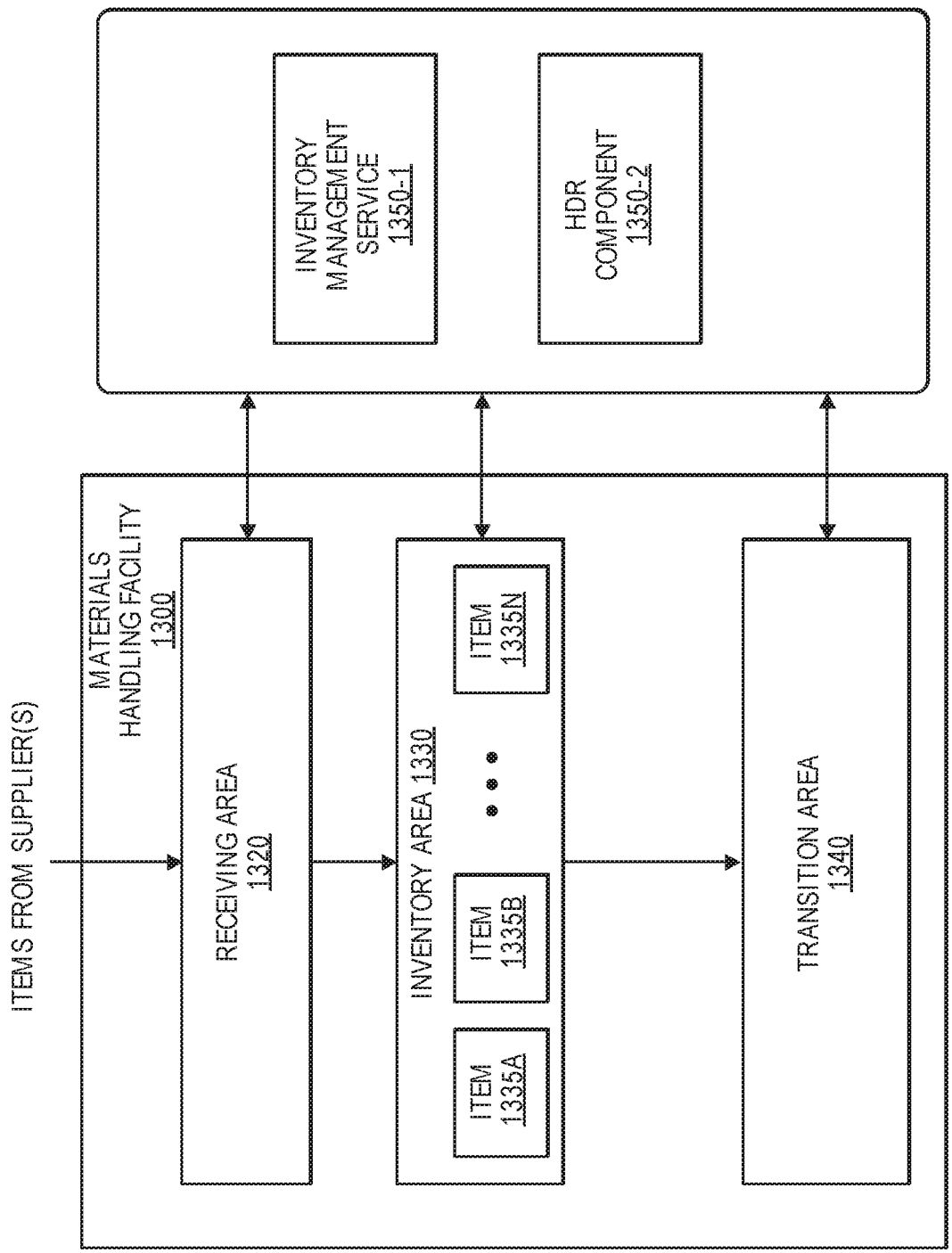
FIG. 13 is a block diagram illustrating a materials handling facility, in accordance with described implementations.

FIG. 13 illustrates a block diagram of a materials handling facility configured to store and manage inventory items, in accordance with the described implementations. As shown, a materials handling facility 1300 includes a receiving area 1320, an inventory area 1330 configured to store an arbitrary number of inventory items 1335A-1335N, and one or more transition areas 1340. The arrangement of the various areas within materials handling facility 1300 is depicted functionally rather than schematically. For example, in some implementations, multiple different receiving areas 1320, inventory areas 1330 and/or transition areas 1340 may be interspersed rather than segregated. Additionally, the materials handling facility 1300 includes an inventory management service 1350-1 configured to interact with each of receiving area 1320, inventory area 1330, transition area 1340 and/or agents within the materials handling facility 1300. Likewise, the materials handling facility includes an HDR component 1350-2 configured to interact with imaging devices within the materials handling facility and produce HDR images from the images provided by the different image sensors of each imaging device.

The materials handling facility 1300 may be configured to receive different kinds of inventory items 1335 from various suppliers and to store them until an agent retrieves one or more of the items. The general flow of items through the materials handling facility 1300 is indicated using arrows. Specifically, as illustrated in this example, items 1335 may be received from one or more suppliers, such as manufacturers, distributors, wholesalers, etc., at receiving area 1320. In various implementations, items 1335 may include merchandise, commodities, perishables, or any suitable type of item depending on the nature of the enterprise that operates the materials handling facility 1300.

Upon being received from a supplier at receiving area 1320, items 1335 may be prepared for storage. For example, in some implementations, items 1335 may be unpacked or otherwise rearranged and the inventory management service (which, as described, may include one or more software applications executing on a computer system) may be updated to reflect the type, quantity, condition, cost, location or any other suitable parameters with respect to newly received items 1335. It is noted that items 1335 may be stocked, managed or dispensed in terms of countable, individual units or multiples of units, such as packages, cartons, crates, pallets or other suitable aggregations. Alternatively, some items 1335, such as bulk products, commodities, etc., may be stored in continuous or arbitrarily divisible amounts that may not be inherently organized into countable units. Such items 1335 may be managed in terms of measurable quantities, such as units of length, area, volume, weight, or other dimensional properties characterized by units of measurement. Generally speaking, a quantity of an item 1335 may refer to either a countable number of individual or aggregate units of an item 1335 or a measurable amount of an item 1335, as appropriate.

After arriving through receiving area 1320, items 1335 may be stored within inventory area 1330 on an inventory shelf. In some implementations, like items 1335 may be stored or displayed together in bins, on shelves or via other suitable storage mechanisms, such that all items 1335 of a given kind are stored in one location. In other implementations, like items 1335 may be stored in different locations. For example, to optimize retrieval of certain items 1335 having high turnover or velocity within a large physical facility, those items 1335 may be stored in several different locations to reduce congestion that might occur at a single point of storage.

When an order specifying one or more items 1335 is received, or as an agent progresses through the materials handling facility 1300, the corresponding items 1335 may be selected or "picked" (an event) from the inventory area 1330. For example, in one implementation, an agent may have a list of items to pick and may progress through the materials handling facility picking items 1335 from the inventory area 1330. In other implementations, an agent may pick items 1335 using written or electronic pick lists derived from orders. In some instances, an item may need to be repositioned from one location within the inventory area 1330 to another location. For example, in some instances, an item may be picked from its inventory location, moved a distance, and placed (an event) at another location. An "event," as used herein, is a detected movement of an item. For example, an event may be a detected movement of an item when the item is picked from an inventory location or a detected movement of an item when the item is placed at an inventory location.

As discussed herein, as the agent moves through the materials handling facility, images of the agent may be obtained and processed to determine an agent pattern representative of the agent and to track a position of the agent as the agent moves. Likewise, in some implementations, descriptors representative of the agent may be periodically determined for the agent from the obtained images as the agent moves about the materials handling facility. By generating HDR images, as described herein, tracking and/or re-identification of the agent and/or items (collectively objects) is improved.

Figure 14:
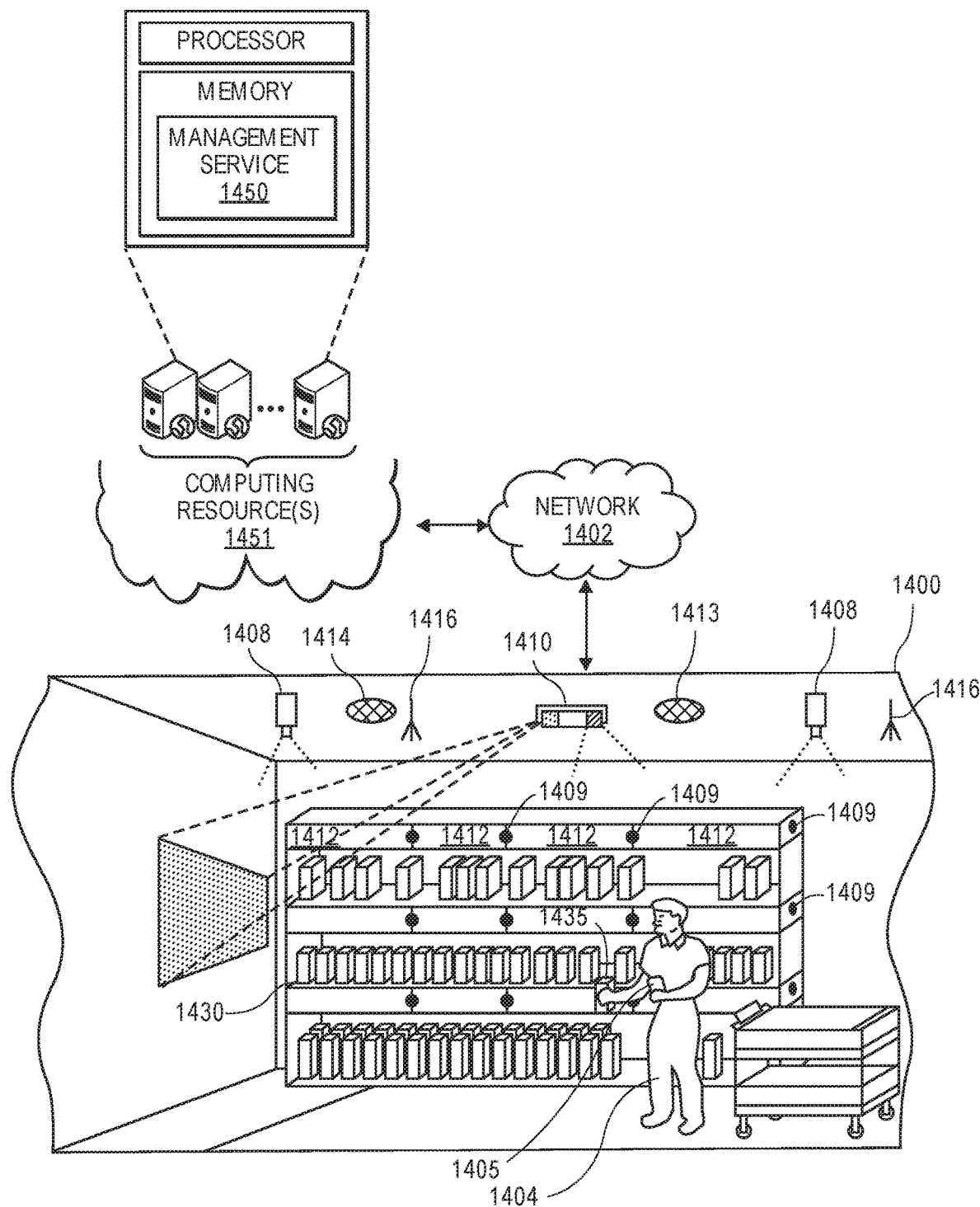
FIG. 14 shows additional components of the materials handling facility of FIG. 13, in accordance with described implementations.

FIG. 14 shows additional components of a materials handling facility 1400, according to one implementation. Generally, the materials handling facility 1400 may include one or more imaging devices 1408, 1409, such as cameras, some or all of which may include multiple aligned image sensors and corresponding lenses. In some implementations, the overhead imaging devices 1408 may be positioned overhead, such as on the ceiling, and oriented toward a surface (e.g., floor) of the materials handling facility so that the overhead imaging devices 1408 are approximately perpendicular with the surface and the field of view is oriented toward the surface. The overhead imaging devices 1408 are used to capture images of agents and/or locations within the materials handling facility from an overhead or top-down view. Likewise, one or more side-view imaging devices 1409 may be positioned on, inside, or adjacent to inventory areas and/or otherwise positioned and oriented so that an inventory location is within a field of view of the side-view imaging device 1409. For example, a series of side-view imaging devices 1409 may be positioned on external portions of inventory areas and oriented to capture images of agents and/or other inventory locations (e.g., those on an opposite side of an aisle). In some implementations, side-view imaging devices 1409 may be arranged throughout the materials handling facility such that each inventory location is within a field of view of at least two side-view imaging devices 1409.

In addition to imaging devices, other input devices, such as pressure sensors, infrared sensors, scales, light curtains, load cells, RFID readers, etc., may be utilized with the implementations described herein. For example, a pressure sensor and/or a scale may be used to detect the presence or absence of items and/or to determine when an item is added and/or removed from inventory areas. Likewise, an RFID reader that can detect a tag included on an item as the item passes into or out of the inventory location may be utilized to detect the presence or absence of an item. For example, if the item includes an RFID tag, an RFID reader may detect the RFID tag as the item passes into or out of the inventory location. Alternatively, or in addition thereto, the inventory shelf may include one or more antenna elements coupled to an RFID reader that are configured to read RFID tags of items located on the inventory shelf.

When an agent 1404 arrives at the materials handling facility 1400, one or more overhead images of the agent 1404 may be captured and processed using overhead imaging devices 1408 and/or the management service 1450. For example, images of the agent 1404 may be processed to identify the agent. This may be done using a variety of techniques, such as object recognition, pattern matching, etc. Generating HDR images, as discussed herein, of the agent as the agent moves through the facility, improves the ability to identify, track, and/or re-identify the agent between images because there is minimal or no loss of data due to overexposure or underexposure of regions of an image resulting from varying lighting conditions within the materials handling facility. In some implementations, rather than or in addition to processing images to identify the agent 1404, other techniques may be utilized to identify the agent. For example, the agent may provide an identification (e.g., agent name, password), the agent may present an identifier (e.g., identification badge, card), an RFID tag in the possession of the agent may be detected, a visual tag (e.g., barcode, bokode, watermark) in the possession of the agent may be detected, etc.

The HDR images and/or other inputs may also be used to establish an agent pattern for the agent 1404 while located in the materials handling facility 1400. For example, agent patterns are determined from HDR images produced from image data received from overhead imaging devices 1408. As the agent moves, the position and orientation of the agent pattern is updated and is used to track the agent as the agent moves throughout the materials handling facility.

In addition to establishing an agent pattern when the agent first arrives at the materials handling facility and is identified, one or more descriptors representative of the agent or the agent pattern may be determined. For example, one or more descriptor regions may be established, such as a torso region or a head region, and a descriptor representative of the region may be determined, stored in a descriptor data store and associated with the agent or the agent pattern while the agent is located in the materials handling facility. In some implementations, the determined agent patterns of the agent may be stored and maintained as representative of the agent and used at a later point in time to identify the agent (e.g., when the agent returns to the materials handling facility on a different date). In comparison, the descriptors may only be stored for a limited period of time and used to identify the agent during the current time they are in the materials handling facility. When the agent exits the materials handling facility, the descriptors may be discarded.

Returning to FIG. 14, in some implementations, an agent 1404 located in the materials handling facility 1400 may possess a portable device 1405 and obtain information about items located within the materials handling facility 1400, receive confirmation that the inventory management service has correctly identified items that are picked and/or placed by the agent 1404, receive requests for confirmation regarding one or more event aspects, etc. Generally, the portable device has at least a wireless module to facilitate communication with the management service 1450 (e.g., the inventory management service) and a display (e.g., a touch based display) to facilitate visible presentation to and interaction with the agent. The portable device 1405 may store a unique identifier and provide that unique identifier to the management service 1450 and be used to identify the agent 1404. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device may operate in conjunction with or may otherwise utilize or communicate with one or more components of the management service 1450. Likewise, components of the management service 1450 may interact and communicate with the portable device as well as identify the agent, communicate with the agent via other means and/or communicate with other components of the management service 1450.

Generally, the management service 1450 may include or communicate with one or more input/output devices, such as imaging devices (e.g., cameras) 1408, projectors 1410, displays 1412, speakers 1413, microphones 1414, illumination elements (e.g., lights), etc., to facilitate communication between the management service 1450 and/or the agent and detection of items, events and/or other actions within the materials handling facility 1400. In some implementations, multiple input/output devices may be distributed within the materials handling facility 1400. For example, there may be multiple imaging devices, such as imaging devices located on the ceilings (overhead cameras) and/or cameras (such as pico-cameras) located in the aisles near the inventory items (side-view cameras).

Likewise, the management service 1450 may also include one or more communication devices, such as wireless antennas 1416, which facilitate wireless communication (e.g., Wi-Fi, Near Field Communication (NFC), Bluetooth) between the management service 1450 and other components or devices. The management service 1450 may also include one or more computing resource(s) 1451, such as a server system, that may be local to the environment (e.g., materials handling facility), remote from the environment, or any combination thereof.

The management service 1450 may utilize antennas 1416 within the materials handling facility 1400 to create a network 1402 (e.g., Wi-Fi) so that the components and devices can connect to and communicate with the management service 1450. For example, when the agent picks an item 1435 from an inventory area 1430, image data from an imaging device may be transformed to the global color space and processed to detect the removal of the item and the management service 1450 may receive information, such as image data of the performed action (item pick from the inventory area), identifying that an item has been picked from the inventory area 1430. The event aspects (e.g., agent identity, action performed, item involved in the event) may then be determined by the management service 1450.

Figure 15:
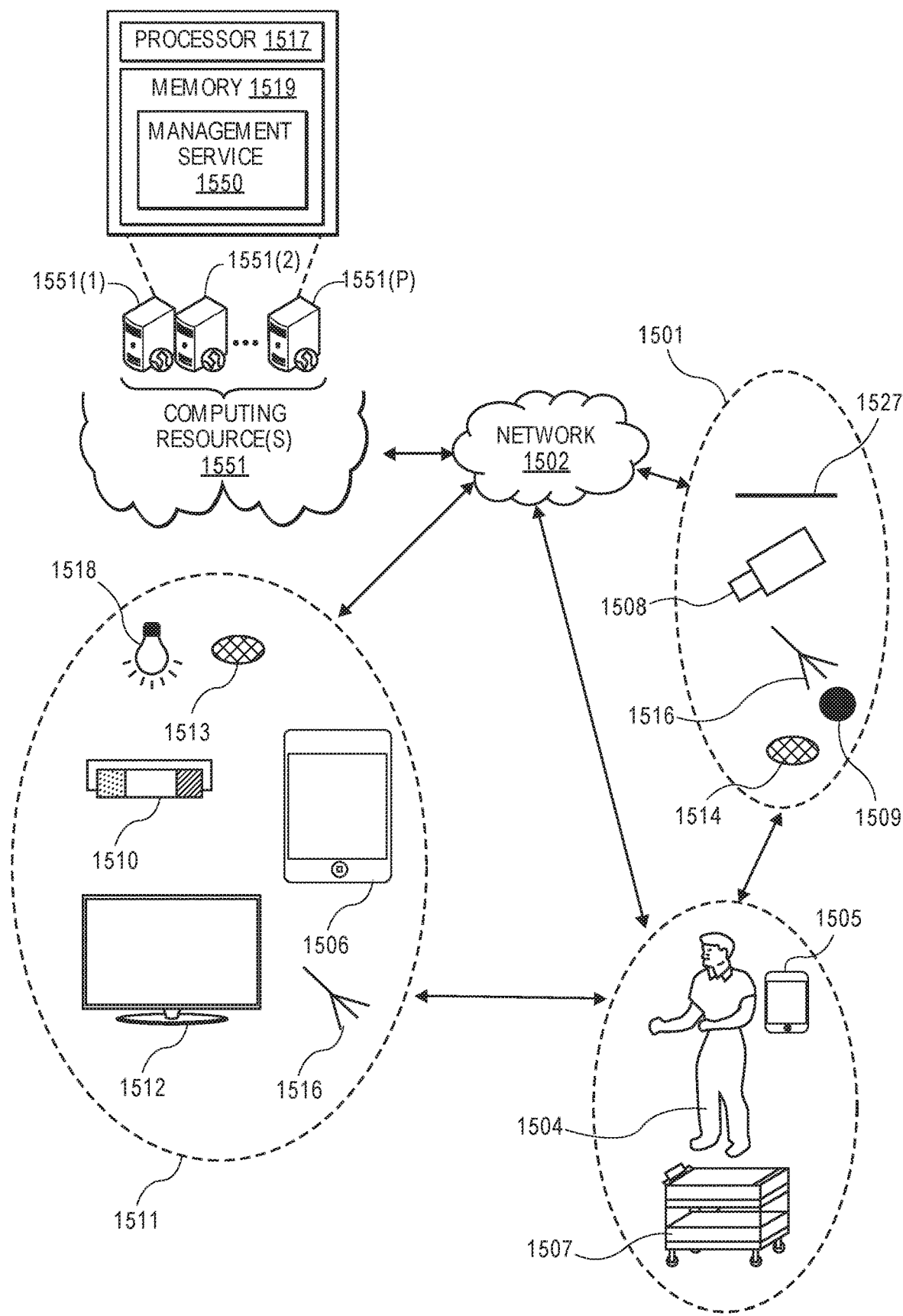
FIG. 15 shows components and communication paths between component types utilized in a materials handling facility of FIG. 13, in accordance with described implementations.

FIG. 15 shows example devices and communication paths between device types utilized in a materials handling facility, according to described implementations. A portable device 1505 may communicate and interact with various devices over a variety of communication paths. Generally, the system may include input components 1501, output components 1511 and computing resource(s) 1551. The input components 1501 may include an overhead imaging device 1508, side-view imaging device 1509, a multiple-device apparatus 1527, microphone 1514, antenna 1516, or any other device or component that is capable of receiving input about the surrounding environment and/or from the agent. The output components 1511 may include a projector 1510, a portable device 1506, a display 1512, an antenna 1516, a radio, speakers 1513, illumination sources 1518 (e.g., lights), and/or any other device or component that is capable of providing output to the surrounding environment and/or the agent.

The system may also include computing resource(s) 1551. The computing resource(s) 1551 may be local to the environment (e.g., materials handling facility), remote from the environment, or any combination thereof. Likewise, the computing resource(s) 1551 may be configured to communicate over a network 1502 with input components 1501, output components 1511 and/or directly with the portable device 1505, an agent 1504 and/or a tote 1507.

As illustrated, the computing resource(s) 1551 may be remote from the environment and implemented as one or more servers 1551(1), 1551(2), . . . , 1551(P) and may, in some instances, form a portion of a network-accessible computing platform implemented as a computing infrastructure of processors, storage, software, data access, and so forth that is maintained and accessible by components/devices of the system materials handling facility and/or the portable device 1505 via a network 1502, such as an intranet (e.g., local area network), the Internet, etc. The computing resources 1551 may process images of agents to identify the agent, process images of items to identify items, determine a location of items, determine a position of items, generate HDR images, and the like. The server system(s) 1551 does not require end-agent knowledge of the physical location and configuration of the system that delivers the services. Common expressions associated for these remote computing resource(s) 1551 include "on-demand computing," "software as a service (SaaS)," "platform computing," "network-accessible platform," "cloud services," "data centers," and so forth.

Each of the servers 1551(1)-(P) include a processor 1517 and memory 1519, which may store or otherwise have access to management service 1550, which may include or provide image processing (e.g., for agent identification, item identification, etc.), inventory tracking, and/or location determination.

The network 1502 may utilize wired technologies (e.g., wires, USB, fiber optic cable, etc.), wireless technologies (e.g., radio frequency, infrared, NFC, cellular, satellite, Bluetooth, etc.), or other connection technologies. The network 1502 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The various sensors and computer systems described above may collect a wide variety of data relating to users of systems or facilities employing such sensors or computer systems. The data relating to users may include, for example, images, video, location information, travel patterns, personal identification information, transaction history information, user preferences, and the like. The sensors, systems, and techniques described herein would be typically configured to process this information in a manner that ensures compliance with all appropriate laws, regulations, standards, and the like.

Figure 16:
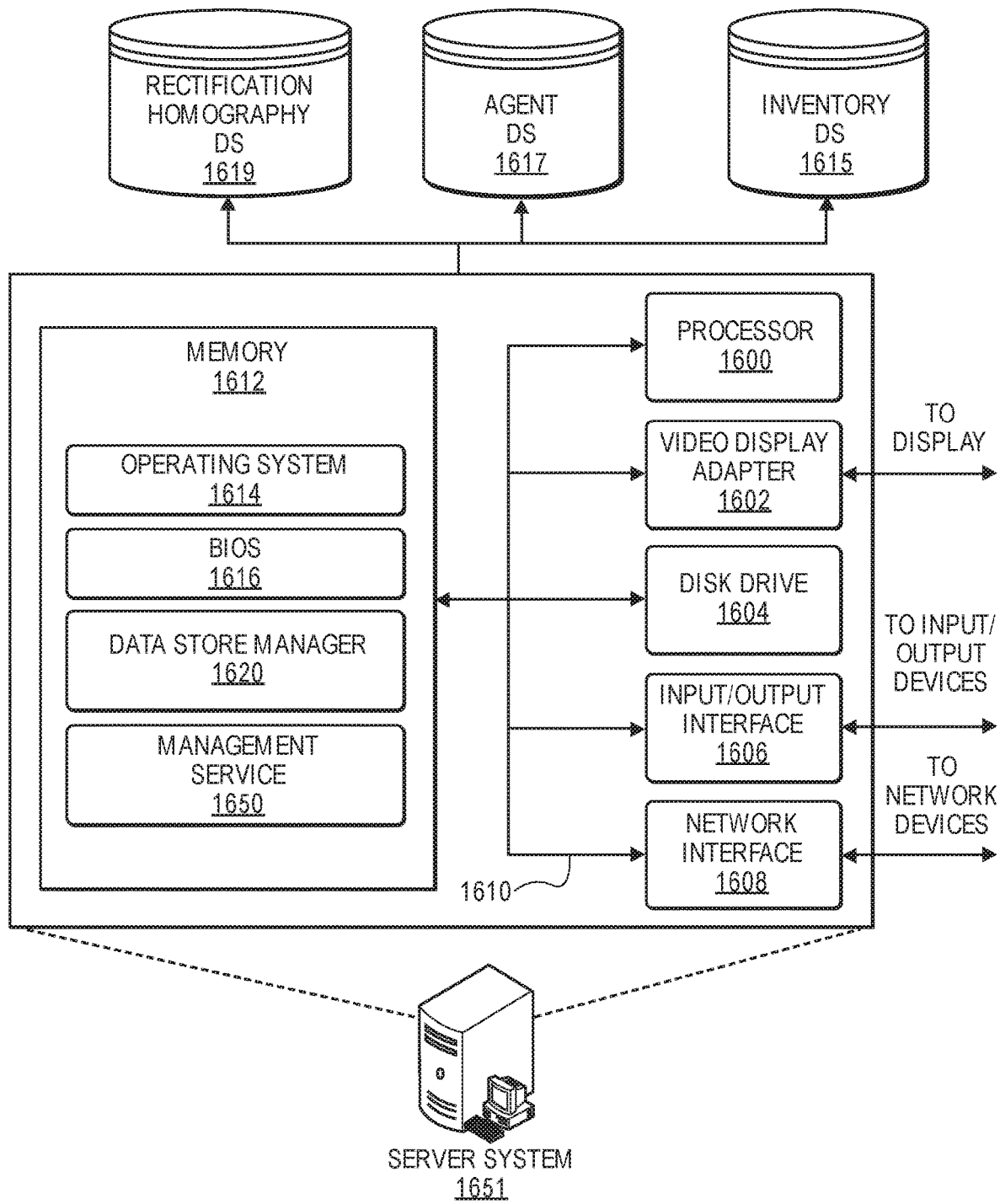
FIG. 16 is a block diagram of an illustrative implementation of a server system that may be used with various implementations.

FIG. 16 is a pictorial diagram of an illustrative implementation of a server system 1651, that may be used in the implementations described herein. The server system illustrated in FIG. 16, or another similar server system, may be configured as the management service (e.g., inventory management service.

The server system 1651 may include a processor 1600, such as one or more redundant processors, a video display adapter 1602, a disk drive 1604, an input/output interface 1606, a network interface 1608, and a memory 1612. The processor 1600, the video display adapter 1602, the disk drive 1604, the input/output interface 1606, the network interface 1608, and the memory 1612 may be communicatively coupled to each other by a communication bus 1610.

The video display adapter 1602 provides display signals to a local display permitting an operator of the server system 1651 to monitor and configure operation of the server system 1651. The input/output interface 1606 likewise communicates with external input/output devices, such as a mouse, keyboard, scanner, or other input and output devices that can be operated by an operator of the server system 1651. The network interface 1608 includes hardware, software, or any combination thereof, to communicate with other computing devices. For example, the network interface 1608 may be configured to provide communications between the server system 1651 and other computing devices via a network, such as the network shown in FIG. 15.

The memory 1612 generally comprises random access memory (RAM), read-only memory (ROM), flash memory, and/or other volatile or permanent memory. The memory 1612 is shown storing an operating system 1614 for controlling the operation of the server system 1651. A binary input/output system (BIOS) 1616 for controlling the low-level operation of the server system 1651 is also stored in the memory 1612.

The memory 1612 additionally stores program code and data for providing network services. The data store manager application 1620 facilitates data exchange between the inventory table data store 1615, the agent profile data store 1617, and/or the rectified homography data store 1619.

As used herein, the term "data store" refers to any device or combination of devices capable of storing, accessing and retrieving data which may include any combination and number of data servers, databases, data storage devices and data storage media in any standard, distributed or clustered environment. The server system 1651 can include any appropriate hardware and software for integrating with the data stores 1615, 1617, and 1619 as needed to execute aspects of the management service 1650.

The data stores 1615, 1617, and 1619 can include several separate data tables, databases or other data storage mechanisms and media for storing data relating to a particular aspect. For example, the data stores 1615, 1617, and 1619 illustrated include mechanisms for maintaining inventory information (e.g., item locations, images of item when properly positioned, depth map information for an item located on an inventory shelf, item features), agent profile information, agent pattern information, correlations between imaging devices and real-world positions, rectified homographies, etc.

It should be understood that there can be many other aspects that may be stored in the data stores 1615, 1617, and 1619. The data stores 1615, 1617, and 1619 are operable, through logic associated therewith, to receive instructions from the server system 1651 and obtain, update or otherwise process data in response thereto.

The memory 1612 may also include the inventory management service 1650. The management service 1650 may be executable by the processor 1600 to implement one or more of the functions of the server system 1651. In one implementation, the management service 1650 may represent instructions embodied in one or more software programs stored in the memory 1612. In another implementation, the management service 1650 can represent hardware, software instructions, or a combination thereof.

It will be appreciated by those of ordinary skill in the art that such a system could operate equally well in a system having fewer or a greater number of components than are illustrated in FIG. 16. Thus, the depiction in FIG. 16 should be taken as being illustrative in nature and not limiting to the scope of the disclosure.

The concepts disclosed herein may be applied within a number of different devices and computer systems, including, for example, general-purpose computing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and image processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system, comprising:
    a first image sensor oriented toward an inventory location within a materials handling facility;
    a second image sensor horizontally aligned with the first image sensor, at a first distance from the first image sensor and oriented toward the inventory location;
    one or more processors; and
    a memory storing program instructions that when executed by the one or more processors cause the one or more processors to at least:
        receive, from the first image sensor, first image data obtained at a first time and corresponding to a first image of the inventory location obtained at a first exposure, wherein a first region of the first image is overexposed and a first plurality of pixels within the first region do not include data representative of the inventory location;
receive, from the second image sensor, second image data obtained at the first time, and corresponding to a second image of the inventory location obtained at a second exposure that is different than the first exposure;
preprocess the first image data and the second image data, by at least:
perspective warping a first channel of the first image data and a second channel of the second image data according to at least one rectification homography to produce a rectified first channel and a rectified second channel that correlates rows of pixels of the first image data with rows of pixels of the second image data;
determine, based at least in part on the rectified first channel or the rectified second channel, a first boundary of pixels of the first image data surrounding the first region;
alter the second image data to form altered image data that includes a second region that is overexposed and corresponds to the first region of the first image;
determine, based at least in part on the rectified first channel or the rectified second channel, a second boundary of pixels of the second image data surrounding the second region;
form third image data that includes pixel values of a first plurality of pixels of the first image data that are outside the first boundary and pixel values of a second plurality of pixels of the second image data that are inside the second boundary; and
blend at least a portion of the pixel values of the third image data with a third plurality of pixels of the second image data.

2. The system of claim 1, further comprising:
a third image sensor oriented toward the inventory location; and
wherein the program instructions further cause the one or more processors to at least:
receive, from the third image sensor, fourth image data obtained at the first time, and corresponding to a third image of the inventory location obtained at a third exposure that is different than the first exposure and the second exposure;
determine a third boundary of pixels of the fourth image data surrounding a third region of pixels within the fourth image data; and
form fifth image data that includes pixel values of a third plurality of pixels of the fourth image data that is inside the third boundary and pixel values of the third image data.

3. The system of claim 1, wherein the program instructions further cause the one or more processors to at least:
generate a first binary representation of a first luminance channel of the first image data;
generate a second binary representation of a second luminance channel of the second image data; and
wherein the first region is determined at least in part from the first binary representation.

4. The system of claim 3, wherein the program instructions further cause the one or more processors to at least:
transform the first binary representation into a first compressed representation; and
wherein the first region is determined at least in part from the first compressed representation.

5. A computer implemented method, comprising:
under control of one or more computing systems configured with executable instructions,
receiving, from a first image sensor, first image data representative of a first image obtained at a first exposure, wherein a first region of the first image is overexposed;
receiving, from a second image sensor, second image data representative of a second image obtained at a second exposure that is different than the first exposure;
preprocessing the first image data and the second image data, wherein preprocessing includes:
perspective warping a first channel of the first image data and a second channel of the second image data according to at least one rectification homography to produce a rectified first channel and a rectified second channel that correlates rows of pixels of the first image data with rows of pixels of the second image data;
determining, based at least in part on one or more of the rectified first channel or the rectified second channel, a first boundary of pixels of the first image data surrounding the first region;
determining, based at least in part on one or more of the rectified first channel or the rectified second channel, a second boundary of pixels of the second image data surrounding a second region within the second image data that corresponds to the first region;
forming third image data that includes: pixel values of a first plurality of pixels of the first image data that are outside the first boundary of pixels of the first image data, and pixel values of a second plurality of pixels of the second image data that are inside the second boundary of pixels of the second image data; and
blending pixel values of at least a portion of the first plurality of pixels with pixel values of at least a portion of the second image data.

6. The computer implemented method of claim 5, further comprising:
aligning at least a portion of the first boundary of pixels of the first image data with at least a portion of the second boundary of pixels of the second image data to determine an aligned relationship between the first image data and the second image data.

7. The computer implemented method of claim 5, wherein the first image is taken at a first time and the second image is taken at a second time that is different than the first time.

8. The computer implemented method of claim 5, wherein determining a second boundary includes:
altering the second image data to cause pixels of the second image data to become overexposed and form a second region having a similar shape and a similar size as the first region.

9. The computer implemented method of claim 5, wherein the first exposure is based on one or more of a shutter speed corresponding to the first image sensor, an aperture corresponding to the first image sensor, or a sensitivity of the first image sensor.

10. The computer implemented method of claim 5, wherein determining a first boundary includes:
generating a first binary representation of the first channel such that each pixel of the first image data has a corresponding binary value;
transforming the first binary representation into a first compressed representation; and determining a first boundary within the first compressed representation that includes a first plurality of pixels having a first binary value that are adjacent to pixels having a second binary value.

11. The computer implemented method of claim 10, wherein determining a second boundary includes:
generating a second binary representation of the second channel such that each pixel of the first image data has a corresponding binary representation; and
determining a second boundary within the second binary representation that includes a second plurality of pixels having the first binary value that are adjacent to pixels having the second binary value.

12. The computer implemented method of claim 11, further comprising:
matching at least a portion of the first plurality of pixels with at least a portion of the second plurality of pixels; and
updating a disparity map indicating a disparity between the first image data and the second image data, wherein the disparity map indicates a horizontal offset between pixels of the first image data and pixels of the second image data.

13. The computer implemented method of claim 5, further comprising:
aligning the first image data and the second image data, based at least in part on the first boundary and the second boundary so that pixels of the first boundary of pixels are aligned with pixels of the second boundary of pixels.

14. The computer implemented method of claim 5, wherein forming the third image data includes:
extracting, from the second image data, at least one channel of the second image data corresponding to pixels within the second boundary;
extracting, from the first image data, at least one channel of the first image data corresponding to pixels outside the first boundary; and
forming third image data that includes the at least one channel extracted from the second image data and the at least one channel extracted from the first image data.

15. The computer implemented method of claim 5, wherein the first image data corresponds to a YUV color space.

16. A system, comprising:
a first image sensor having a first field of view that includes an object;
a second image sensor having a second field of view that includes the object;
one or more processors; and
a memory storing program instructions that when executed by the one or more processors cause the at least one processor to at least:
receive, from the first image sensor, first image data having a first exposure, wherein the first image data includes a first plurality of pixels, each of the first plurality of pixels having a corresponding first luminance channel, first color channel, and second color channel, wherein at least some of the first plurality of pixels are overexposed;
receive, from the second image sensor, second image data having a second exposure that is different than the first exposure, wherein the second image data includes a second plurality of pixels, each of the second plurality of pixels having a corresponding second luminance channel, third color channel, and fourth color channel;
preprocess the first image data and the second image data, by at least:
perspective warping the first luminance channel and the second luminance channel according to at least one rectification homography to produce a rectified first luminance channel and a rectified second luminance channel that correlates rows of pixels of the first image data with rows of pixels of the second image data;
determine, based at least in part on the rectified first luminance channel or the rectified second luminance channel, a first region that includes a third plurality of pixels of the first image data that are overexposed;
determine a second region that includes a fourth plurality of pixels of the second image data that corresponds to the third plurality of pixels;
match the first plurality of pixels and the second plurality of pixels, based at least in part on the first region and the second region to determine a disparity between the first image data and the second image data;
align the first plurality of pixels and the second plurality of pixels, based at least in part on the disparity; and
form combined image data that includes pixel values of the fourth plurality of pixels of the second image data that are within the second region and pixel values of a seventh plurality of pixels of the first image data that are outside the first region, wherein each pixel of the combined image data includes pixel values having a corresponding third luminance channel, fifth color channel, and sixth color channel.

17. The system of claim 16, wherein the program instructions further cause the one or more processors to at least:
blend at least one of the third luminance channel, the fifth color channel or the sixth color channel with a corresponding first luminance channel, first color channel, or second color channel.

18. The system of claim 16, further comprising:
a third image sensor having a third field of view that includes the object; and
wherein the program instructions further cause the one or more processors to at least:
receive, from the third image sensor, fourth image data having a third exposure that is different than the first exposure and the second exposure;
align an eighth plurality of pixels of the fourth image data with pixels of the first image data; and
wherein the combined image data further includes pixel values corresponding to at least a portion of the eighth plurality of pixels of the fourth image data.

19. The system of claim 16, wherein the first image sensor and the second image sensor are horizontally aligned.

20. The system of claim 16, wherein the disparity is based at least in part on a distance between the first image sensor and the second image sensor.

* * * * *